US012561892B2

(12) United States Patent
Kikuchi

(10) Patent No.: US 12,561,892 B2
(45) Date of Patent: Feb. 24, 2026

(54) IMAGE PROCESSING DEVICE, IMAGE PROCESSING METHOD, AND PROGRAM, FOR HIGH-DEFINITION CREATION OF AN IMAGE ON A SCREEN

(71) Applicant: FUJIFILM CORPORATION, Tokyo (JP)

(72) Inventor: Hiroaki Kikuchi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 93 days.

(21) Appl. No.: 18/534,725

(22) Filed: Dec. 11, 2023

(65) Prior Publication Data

US 2024/0119657 A1     Apr. 11, 2024

Related U.S. Application Data

(63) Continuation of application No. PCT/JP2022/022785, filed on Jun. 6, 2022.

(30) Foreign Application Priority Data

Jun. 29, 2021    (JP) ................................. 2021-108048

(51) Int. Cl.
*G06T 15/10*       (2011.01)
*G06T 7/70*        (2017.01)
*G06T 17/20*       (2006.01)

(52) U.S. Cl.
CPC ................ *G06T 15/10* (2013.01); *G06T 7/70* (2017.01); *G06T 17/20* (2013.01);
(Continued)

(58) Field of Classification Search
CPC ........... G06T 15/10; G06T 7/70; G06T 17/20; G06T 2207/10028; G06T 2210/21
See application file for complete search history.

(56) References Cited

U.S. PATENT DOCUMENTS 8,948,498 B1     2/2015  Hickman et al.
10,803,611 B2 *  10/2020  Kay .......................... G06T 7/73
(Continued)

FOREIGN PATENT DOCUMENTS

JP           4543820 B2     9/2010
JP        2012-220471 A    11/2012
(Continued)

OTHER PUBLICATIONS

Chao Wang et al., "As-is 3D Thermal Modeling for Existing Building Envelopes Using a Hybrid LIDAR System", Journal of Computing in Civil Engineering, 2013, 27, 645-656.
(Continued)

*Primary Examiner* — Said Broome
(74) *Attorney, Agent, or Firm* — SOLARIS Intellectual Property Group, PLLC

(57)     ABSTRACT

A processor of an image processing device is configured to: acquire three-dimensional coordinates of a three-dimensional distance-measuring sensor system defined in a three-dimensional coordinate system applied to a three-dimensional distance-measuring sensor, the three-dimensional coordinates of the three-dimensional distance-measuring sensor system being capable of specifying positions of a plurality of measurement points; acquire three-dimensional coordinates of an imaging apparatus system, on the basis of the three-dimensional coordinates of the three-dimensional distance-measuring sensor system; convert the three-dimensional coordinates of the imaging apparatus system into two-dimensional coordinates of the imaging apparatus system, which are capable of specifying a position in a captured image; convert the three-dimensional coordinates of the imaging apparatus system into two-dimensional coordinates of a display system, which are capable of specifying a position on a screen; and assign a pixel constituting the
(Continued)

TRAVELING DIRECTION        S1 captured image to an interpolation position specified through an interpolating method using the two-dimensional coordinates of the imaging apparatus system and the two-dimensional coordinates of the display system, on the screen.

8 Claims, 20 Drawing Sheets

(52) U.S. Cl.
CPC .............. *G06T 2207/10028* (2013.01); *G06T 2210/21* (2013.01); *G06T 2210/56* (2013.01)

(56) References Cited

U.S. PATENT DOCUMENTS

| | | | | |
|---|---|---|---|---|
| 11,158,084 | B2 * | 10/2021 | Ross | G06T 7/75 |
| 11,843,967 | B2 * | 12/2023 | Seong | G06T 19/006 |
| 2006/0007308 | A1 * | 1/2006 | Ide | H04N 23/61 |
| | | | | 348/E7.086 |
| 2019/0188880 | A1 * | 6/2019 | Hattori | B25J 9/1697 |
| 2020/0073358 | A1 * | 3/2020 | Dedkov | G06T 7/74 |

FOREIGN PATENT DOCUMENTS

| | | |
|---|---|---|
| JP | 2015-064755 A | 4/2015 |
| JP | 2017-106749 A | 6/2017 |
| JP | 2018-025551 A | 2/2018 |

OTHER PUBLICATIONS

Toshihiro Asai et al., "Three-dimensional modeling of outdoor environments by integrating omnidirectional distance images and omnidirectional color images", Journal of the IIEEJ, Sep. 25, 2005, vol. 34, No. 5, pp. 529-538.

International Search Report issued in International Application No. PCT/JP2022/022785 on Aug. 16, 2022.

Written Opinion of the ISA issued in International Application No. PCT/JP2022/022785 on Aug. 16, 2022.

International Preliminary Report on Patentability issued in International Application No. PCT/JP2022/022785 on Dec. 6, 2022.

English language translation of the following: Office action dated Oct. 28, 2025 from the JPO in a Japanese patent application No. 2023-531736 corresponding to the instant patent application.

* cited by examiner

[THREE-DIMENSIONAL CAMERA COORDINATE SYSTEM]

CONVERT COORDINATE SYSTEM IN ACCORDANCE WITH ROTATION MATRIX AND TRANSLATION VECTOR

[LiDAR COORDINATE SYSTEM]

FIG. 11

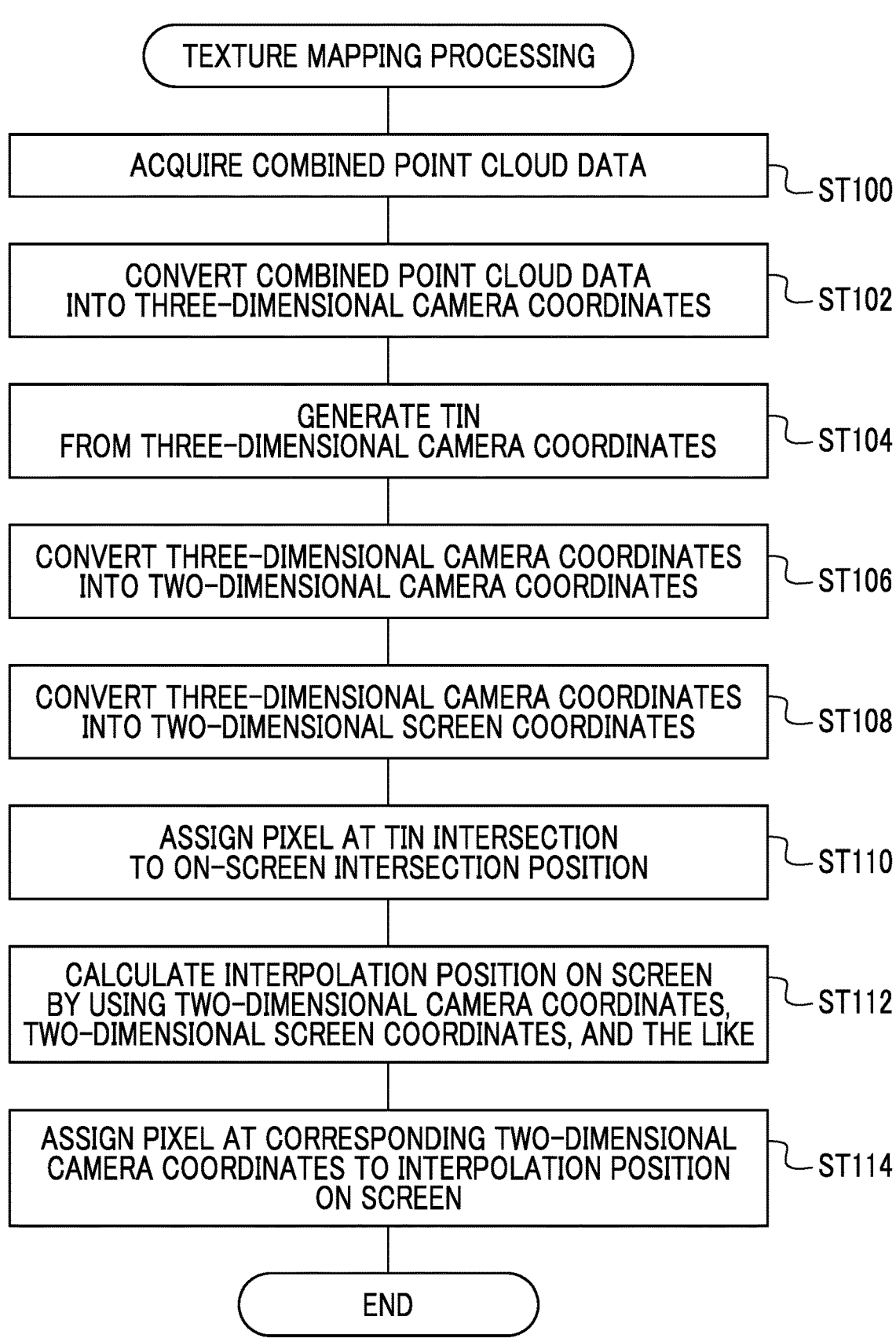

TEXTURE MAPPING PROCESSING

ACQUIRE COMBINED POINT CLOUD DATA — ST100

CONVERT COMBINED POINT CLOUD DATA
INTO THREE-DIMENSIONAL CAMERA COORDINATES — ST102

GENERATE TIN
FROM THREE-DIMENSIONAL CAMERA COORDINATES — ST104

CONVERT THREE-DIMENSIONAL CAMERA COORDINATES
INTO TWO-DIMENSIONAL CAMERA COORDINATES — ST106

CONVERT THREE-DIMENSIONAL CAMERA COORDINATES
INTO TWO-DIMENSIONAL SCREEN COORDINATES — ST108

ASSIGN PIXEL AT TIN INTERSECTION
TO ON-SCREEN INTERSECTION POSITION — ST110

CALCULATE INTERPOLATION POSITION ON SCREEN
BY USING TWO-DIMENSIONAL CAMERA COORDINATES,
TWO-DIMENSIONAL SCREEN COORDINATES, AND THE LIKE — ST112

ASSIGN PIXEL AT CORRESPONDING TWO-DIMENSIONAL
CAMERA COORDINATES TO INTERPOLATION POSITION
ON SCREEN — ST114

END

FIG. 12

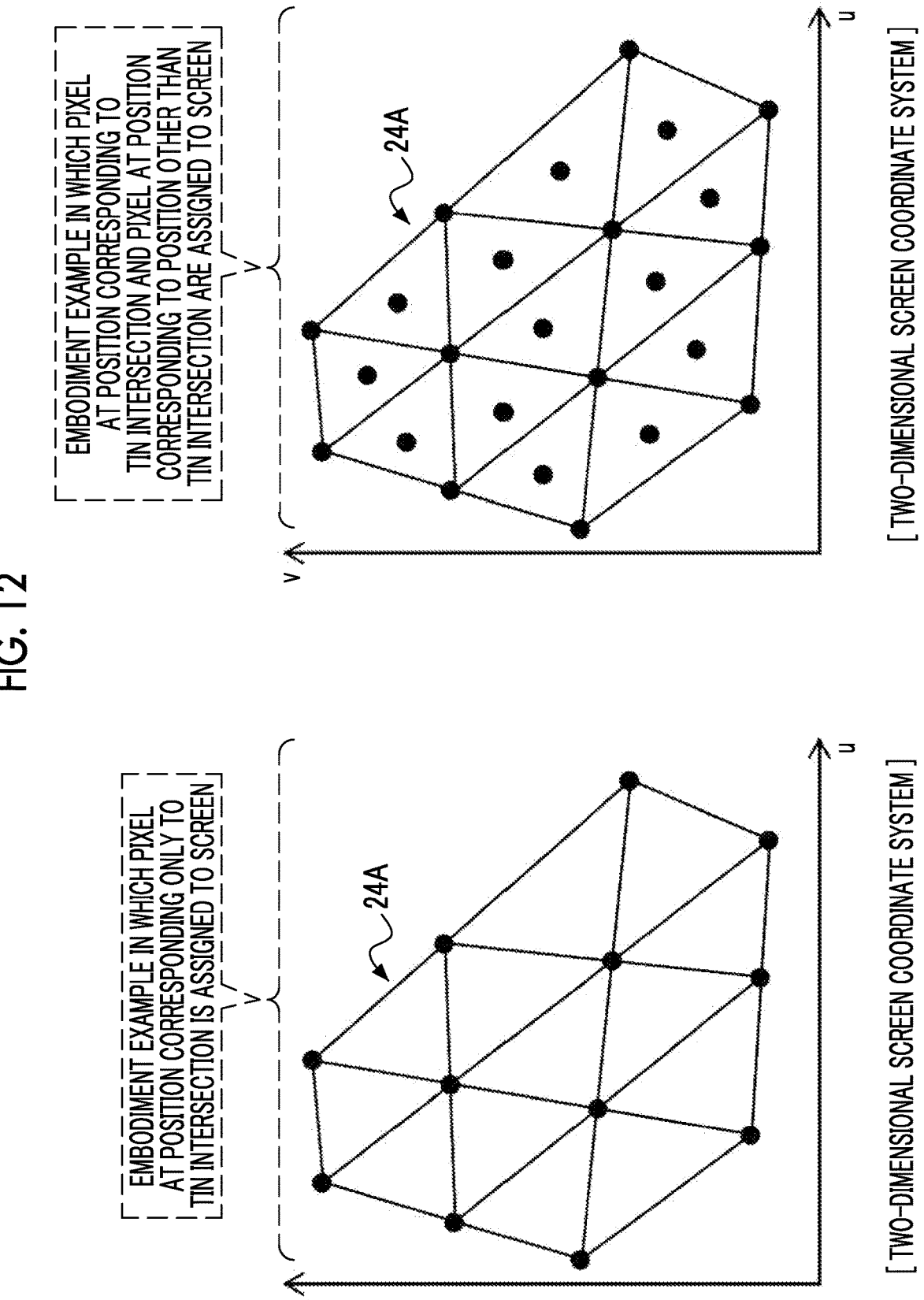

EMBODIMENT EXAMPLE IN WHICH PIXEL AT POSITION CORRESPONDING TO TIN INTERSECTION AND PIXEL AT POSITION CORRESPONDING TO POSITION OTHER THAN TIN INTERSECTION ARE ASSIGNED TO SCREEN

24A

[TWO-DIMENSIONAL SCREEN COORDINATE SYSTEM]

EMBODIMENT EXAMPLE IN WHICH PIXEL AT POSITION CORRESPONDING ONLY TO TIN INTERSECTION IS ASSIGNED TO SCREEN

24A

[TWO-DIMENSIONAL SCREEN COORDINATE SYSTEM]

Figure 20:
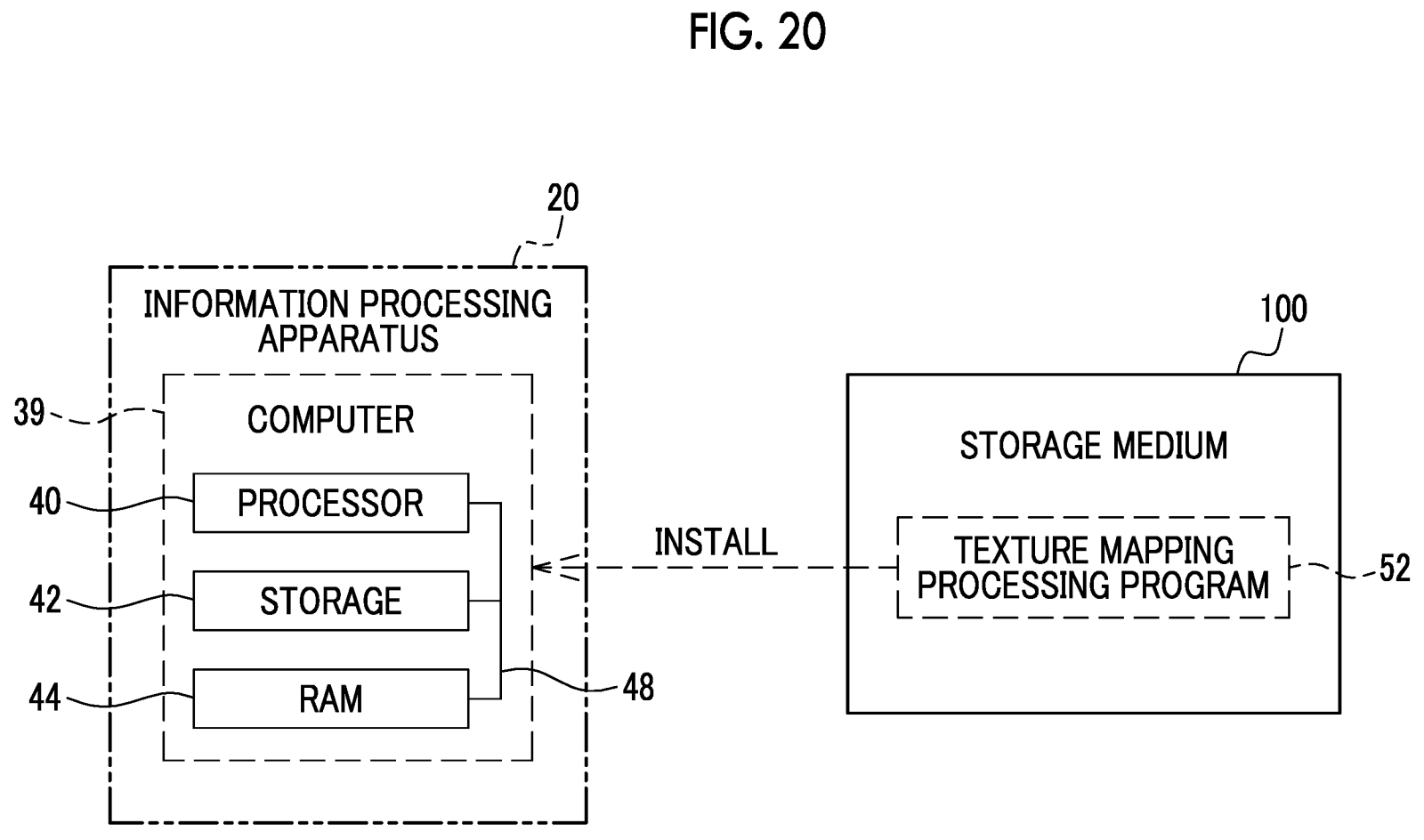

STORAGE MEDIUM    100

TEXTURE MAPPING PROCESSING PROGRAM    52

INSTALL

INFORMATION PROCESSING APPARATUS    20

COMPUTER    39

PROCESSOR    40

STORAGE    42

RAM    44

48

IMAGE PROCESSING DEVICE, IMAGE PROCESSING METHOD, AND PROGRAM, FOR HIGH-DEFINITION CREATION OF AN IMAGE ON A SCREEN

CROSS-REFERENCE TO RELATED APPLICATIONS

This application is a continuation application of International Application No. PCT/JP2022/022785, filed Jun. 6, 2022, the disclosure of which is incorporated herein by reference in its entirety. Further, this application claims priority from Japanese Patent Application No. 2021-108048, filed Jun. 29, 2021, the disclosure of which is incorporated herein by reference in its entirety.

BACKGROUND

1. Technical Field

The technique of the present disclosure relates to an image processing device, an image processing method, and a program.

2. Related Art

JP2012-220471A discloses a developed view generation apparatus. The developed view generation apparatus described in JP2012-220471A includes: a storage unit that stores an image captured through imaging of a wall surface of a tunnel and measurement point data having an intensity value of reflection and coordinate values of a plurality of measurement points on the wall surface obtained by performing laser scan measurement on the wall surface; a conversion unit that performs coordinate conversion for disposing a plurality of measurement points on a wall surface in a development view of the wall surface; a cross-checking unit that performs alignment between an image and the plurality of measurement points subjected to the coordinate conversion, on the basis of the intensity value of the reflection; a displacement shape generation unit that generates a displacement shape, to which an uneven shape in which a value of coordinates in a direction orthogonal to a developed plane of the wall surface is reflected is applied, on the basis of coordinates of the plurality of measurement points subjected to the coordinate conversion; and a drawing unit that draws a pattern of the image subjected to alignment on the displacement shape.

JP2017-106749A discloses a point cloud data acquisition system that includes a first electronic apparatus group having a first electronic apparatus and one or more movable second electronic apparatuses and that acquires point cloud data which has depth information up to each point on a surface of a subject in a pixel unit.

In the point cloud data acquisition system disclosed in JP2017-106749A, the second electronic apparatus includes a three-dimensional measurement unit that has a second coordinate system and that measures point cloud data of a subject on the basis of the second coordinate system and a plurality of markers that are a plurality of predetermined markers having visual characteristics and that are a plurality of markers of which each is provided at a position linearly independent in the second coordinate system. Further, in the point cloud data acquisition system disclosed in JP2017-106749A, the first electronic apparatus includes a position information measurement unit that has a first coordinate system and that measures a subject on the basis of the first coordinate system. The point cloud data acquisition system further has a reference coordinate system, and includes: a marker position information calculation unit that calculates second electronic apparatus position information, which is coordinate values of the plurality of markers in the first coordinate system included in the second electronic apparatus, on the basis of the data measured by the position information measurement unit; a point cloud data coordinate value conversion unit that converts coordinate values of data of respective points in the second coordinate system in the point cloud data measured by the three-dimensional measurement unit included in the second electronic apparatus into coordinate values in a reference coordinate system, on the basis of the second electronic apparatus position information; and a combined point cloud data creation unit that creates one combined piece of point cloud data on the basis of the coordinate values in the reference coordinate system in which a plurality of pieces of point cloud data measured by the three-dimensional measurement unit included in the second electronic apparatus is converted by the point cloud data coordinate value conversion unit.

In JP2018-025551A, there are provided a first electronic apparatus including a depth camera that measures point cloud data of a subject on the basis of a depth camera coordinate system, and a second electronic apparatus including a non-depth camera that acquires two-dimensional image data of the subject, on the basis of a non-depth camera coordinate system. JP2018-025551A discloses a technique of converting the two-dimensional image data of the subject into the point cloud data by associating the point cloud data, in which coordinate values of respective points on a surface of the subject measured by the depth camera are converted into coordinate values in the non-depth camera coordinate system, with two-dimensional image data of the subject acquired by the non-depth camera.

JP4543820B discloses a three-dimensional processing device including: an intermediate interpolation unit that interpolates an auxiliary intermediate point in each line data of three-dimensional vector data including a plurality of line data; a TIN generation unit that forms an irregular triangular network from three-dimensional coordinate values of the auxiliary intermediate point and of a point describing each line data of the three-dimensional vector data to generate triangulated irregular network (TIN) data that defines each triangle; and a grid coordinate calculation unit that includes a search unit searching for a TIN included in the TIN data and a coordinate value calculation unit calculating coordinate values of the grid points included in the searched for TIN, the grid coordinate calculation unit calculating coordinate values of the respective grid points from the TIN data by applying a grid having a predetermined grid interval to the TIN data, and outputting grid data indicating three-dimensional coordinates for each grid point. In the three-dimensional data processing device described in JP4543820B, the coordinate value calculation unit determines a maximum grid range accommodated in a quadrangle circumscribed by the TIN, searches for grid points included in the TIN which is searched for within the maximum grid range, and calculates coordinate values of respective searched for grid points from coordinate values of three apexes of the TIN.

"As-is 3D Thermal Modeling for Existing Building Envelopes Using a Hybrid LIDAR System", Chao Wang, Yong K. Cho, Journal of Computing in Civil Engineering, 2013, 27, 645-656 (hereinafter, referred to as "Non-Patent Document 1") discloses a method of combining measured temperature data with a three-dimensional geometry of a building. In the method described in Non-Patent Document 1, a function of virtually representing an energy efficiency and an environmental impact of an actually existing building is used. Further, the method described in Non-Patent Document 1 provides visual information by using a hybrid type light detection and ranging (LiDAR) system. Thereby, modification of the building is encouraged.

In the method disclosed in Non-Patent Document 1, a 3D temperature model holds geometric point cloud data of a building together with temperature data (a temperature and temperature color information generated on the basis of the temperature) of each point. The LiDAR cannot collect geometric data from a transparent object. Therefore, it is necessary to create an apex of a virtual temperature in window glass. Therefore, an algorithm that specifies a window is used in the method described in Non-Patent Document 1. A framework of a service proposed in Non-Patent Document 1 includes the following elements. (1) A hybrid 3D LiDAR system that simultaneously collects a point cloud and a temperature from an outer wall of the actually existing building. (2) Automatic combination between the collected point cloud and temperature data. (3) A window detection algorithm for supplementing inability of the LiDAR in detection of a window glass. (4) Drawing on a GUI. (5) A program of a web-based room layout for determining mending or the like.

Non-Patent Document 1 describes that the LiDAR and an infrared rays (IR) camera remain stationary with respect to a seat of a pan and tilt unit (PTU) (refer to FIG. 5), and that distortion of the IR camera is calibrated for in advance in an imaging system. Further, Non-Patent Document 1 describes that a black-and-white inspection plate is used (refer to FIG. 7). Further, Non-Patent Document 1 describes that calibration of internal parameters and external parameters is necessary in order to combine a point cloud obtained by LiDAR with an image captured by an IR camera (refer to FIG. 6). The internal parameters refer to a focal length, a lens principal point, a skew distortion coefficient, and a distortion coefficient, and the external parameters refer to matrixes of rotation and parallel translation.

SUMMARY

One embodiment according to the technique of the present disclosure provides an image processing device, an image processing method, and a program capable of contributing to high-definition creation of an image on a screen.

According to a first aspect of the technique of the present disclosure, there is provided an image processing device comprising: a processor; and a memory that is built in or connected to the processor, in which a positional relationship between a three-dimensional distance-measuring sensor and an imaging apparatus having a higher sampling resolution than the three-dimensional distance-measuring sensor is given. The processor is configured to: acquire three-dimensional coordinates of a three-dimensional distance-measuring sensor system defined in a three-dimensional coordinate system applied to the three-dimensional distance-measuring sensor, on the basis of distance measurement results of the three-dimensional distance-measuring sensor for a plurality of measurement points, the three-dimensional coordinates of the three-dimensional distance-measuring sensor system being capable of specifying positions of the plurality of measurement points; acquire three-dimensional coordinates of an imaging apparatus system defined in a three-dimensional coordinate system applied to the imaging apparatus, on the basis of the three-dimensional coordinates of the three-dimensional distance-measuring sensor system; convert the three-dimensional coordinates of the imaging apparatus system into two-dimensional coordinates of the imaging apparatus system, which are capable of specifying a position in a captured image which is captured through imaging performed by the imaging apparatus; convert the three-dimensional coordinates of the imaging apparatus system into two-dimensional coordinates of a display system, which are capable of specifying a position on a screen; and assign a pixel constituting the captured image to an interpolation position specified through an interpolating method using the two-dimensional coordinates of the imaging apparatus system and the two-dimensional coordinates of the display system, on the screen.

According to a second aspect of the technique of the present disclosure, in the image processing device according to the first aspect, the processor is configured to generate a polygonal patch on the basis of the three-dimensional coordinates of the imaging apparatus system, and the three-dimensional coordinates of the imaging apparatus system define a position of an intersection of the polygonal patch.

According to a third aspect of the technique of the present disclosure, in the image processing device according to the second aspect, the interpolation position is a position corresponding to a position other than the intersection of the polygonal patch, on the screen.

According to a fourth aspect of the technique of the present disclosure, in the image processing device according to the second or third aspect, the processor is configured to create a three-dimensional image by assigning a pixel at a position corresponding to the position of the intersection of the polygonal patch, among a plurality of pixels included in the captured image, to an on-screen intersection position corresponding to the position of the intersection of the polygonal patch, on the screen.

According to a fifth aspect of the technique of the present disclosure, in the image processing device according to any one of the second to fourth aspects, the polygonal patch is defined by a triangular mesh or a quadrangular mesh.

According to a sixth aspect of the technique of the present disclosure, in the image processing device according to any one of the first to fifth aspects, the processor is configured to acquire the three-dimensional coordinates of the imaging apparatus system by converting the three-dimensional coordinates of the three-dimensional distance-measuring sensor system into the three-dimensional coordinates of the imaging apparatus system.

According to a seventh aspect of the technique of the present disclosure, in the image processing device according to any one of the first to sixth aspects, the processor is configured to acquire the three-dimensional coordinates of the imaging apparatus system by calculating the three-dimensional coordinates of the imaging apparatus system on the basis of a feature point of a subject included as an image between images of a plurality of frames captured by imaging the subject with the imaging apparatus from different positions.

According to an eighth aspect of the technique of the present disclosure, in the image processing device according to any one of the first to seventh aspects, the position on the screen is a position on a screen of a display.

According to a ninth aspect of the technique of the present disclosure, in the image processing device according to any one of the first to eighth aspects, the memory holds association information in which the three-dimensional coordinates of the three-dimensional distance-measuring sensor system and the two-dimensional coordinates of the imaging apparatus system are associated with each other.

According to a tenth aspect of the technique of the present disclosure, in the image processing device according to the ninth aspect, the processor is configured to assign the pixel constituting the captured image to the interpolation position with reference to the association information.

According to an eleventh aspect of the technique of the present disclosure, there is provided an image processing method comprising: acquiring three-dimensional coordinates of a three-dimensional distance-measuring sensor system defined in a three-dimensional coordinate system applied to a three-dimensional distance-measuring sensor, on the basis of distance measurement results of the three-dimensional distance-measuring sensor for a plurality of measurement points, the three-dimensional coordinates of the three-dimensional distance-measuring sensor system being capable of specifying positions of the plurality of measurement points, on condition that a positional relationship between the three-dimensional distance-measuring sensor and an imaging apparatus having a higher sampling resolution than the three-dimensional distance-measuring sensor is given; acquiring three-dimensional coordinates of an imaging apparatus system defined in a three-dimensional coordinate system applied to the imaging apparatus, on the basis of the three-dimensional coordinates of the three-dimensional distance-measuring sensor system; converting the three-dimensional coordinates of the imaging apparatus system into two-dimensional coordinates of the imaging apparatus system, which are capable of specifying a position in a captured image which is captured through imaging performed by the imaging apparatus; converting the three-dimensional coordinates of the imaging apparatus system into two-dimensional coordinates of a display system, which are capable of specifying a position on a screen; and assigning a pixel constituting the captured image to an interpolation position specified through an interpolating method based on the two-dimensional coordinates of the imaging apparatus system and the two-dimensional coordinates of the display system, on the screen.

According to a twelfth aspect of the technique of the present disclosure, there is provided a program for causing a computer to execute processing comprising: acquiring three-dimensional coordinates of a three-dimensional distance-measuring sensor system defined in a three-dimensional coordinate system applied to the three-dimensional distance-measuring sensor, on the basis of distance measurement results of the three-dimensional distance-measuring sensor for a plurality of measurement points, the three-dimensional coordinates of the three-dimensional distance-measuring sensor system being capable of specifying positions of the plurality of measurement points, on condition that a positional relationship between the three-dimensional distance-measuring sensor and an imaging apparatus having a higher sampling resolution than the three-dimensional distance-measuring sensor is given; acquiring three-dimensional coordinates of an imaging apparatus system defined in a three-dimensional coordinate system applied to the imaging apparatus, on the basis of the three-dimensional coordinates of the three-dimensional distance-measuring sensor system; converting the three-dimensional coordinates of the imaging apparatus system into two-dimensional coordinates of the imaging apparatus system, which are capable of specifying a position in a captured image which is captured through imaging performed by the imaging apparatus; converting the three-dimensional coordinates of the imaging apparatus system into two-dimensional coordinates of a display system, which are capable of specifying a position on a screen; and assigning a pixel constituting the captured image to an interpolation position specified through an interpolating method using the two-dimensional coordinates of the imaging apparatus system and the two-dimensional coordinates of the display system, on the screen.

BRIEF DESCRIPTION OF THE DRAWINGS

Exemplary embodiments according to the technique of the present disclosure will be described in detail based on the following figures, wherein:

FIG. 11 is a flowchart showing an example of a flow of texture mapping processing;

FIG. 12 is a comparison diagram of comparing an embodiment example in which pixels at positions corresponding only to TIN intersections are assigned to a screen, with an embodiment example in which pixels at positions corresponding to the TIN intersections and pixels at positions corresponding to positions other than the TIN intersections are assigned to the screen;

US 12,561,892 B2

7

Figure 19:
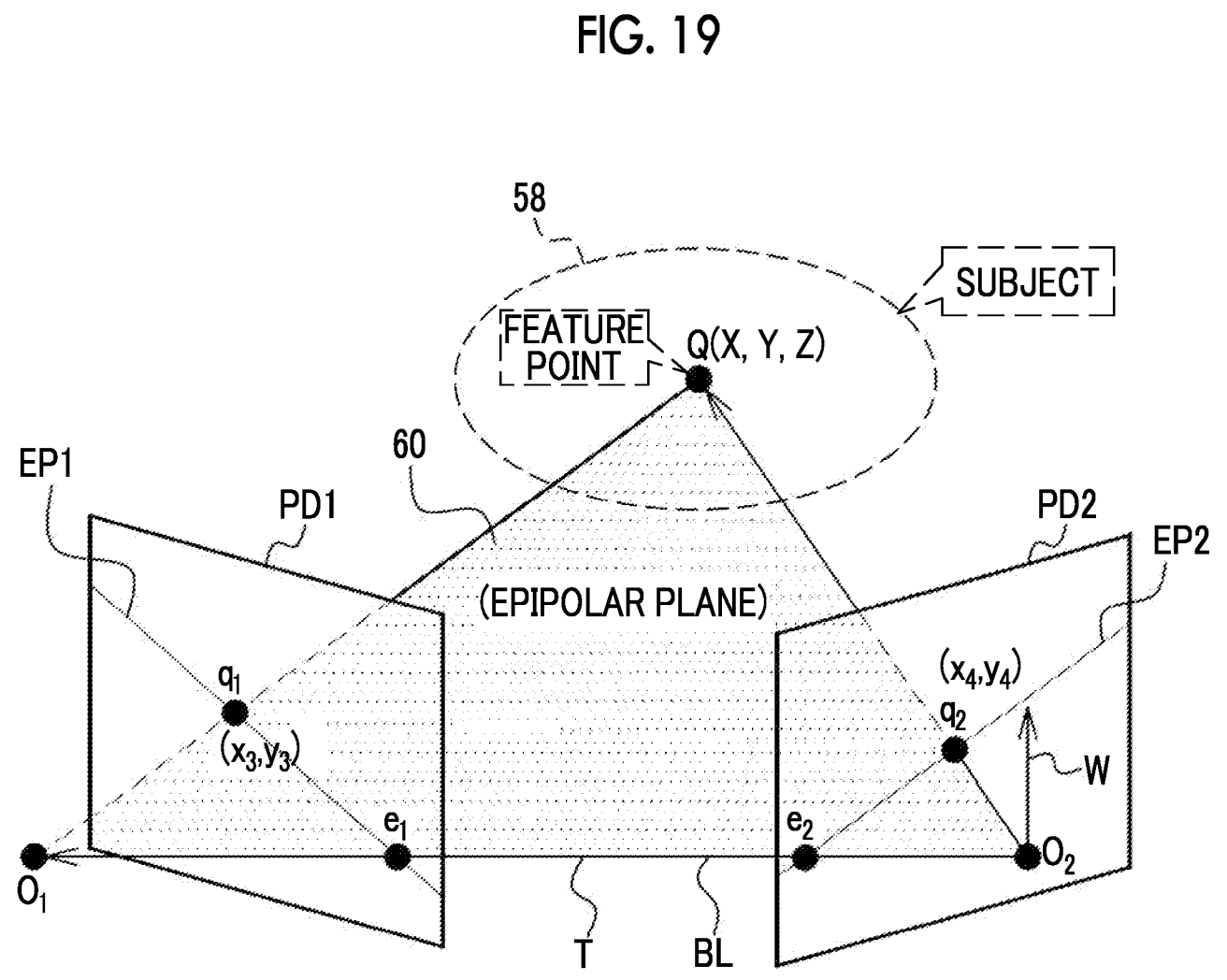

FIG. 19 is a conceptual diagram provided for describing epipolar geometry; and FIG. 20 is a conceptual diagram showing an example of an aspect in which the texture mapping processing is installed on a computer from a storage medium.

DETAILED DESCRIPTION

An example of an embodiment of an image processing device, an image processing method, and a program according to the technique of the present disclosure will be hereinafter described with reference to the accompanying drawings.

First, the terms used in the following description will be described.

CPU is an abbreviation of "central processing unit". GPU is an abbreviation of "graphics processing unit". RAM is an abbreviation of "random-access memory". IC is an abbreviation of "integrated circuit". ASIC is an abbreviation of "application-specific integrated circuit". PLD is an abbreviation of "programmable logic device". FPGA is an abbreviation of "field-programmable gate array". SoC is an abbreviation of "system-on-chip". SSD is an abbreviation of "solid-state drive". USB is an abbreviation of "Universal Serial Bus". HDD is an abbreviation of "hard disk drive". EL is an abbreviation of "electroluminescence". I/F is an abbreviation of "interface". UI is an abbreviation of "user interface". CMOS is an abbreviation of "complementary metal-oxide-semiconductor". CCD is an abbreviation of "charge-coupled device". LiDAR is an abbreviation of "light detection and ranging". TIN is an abbreviation of "triangulated irregular network". In the present specification, an intersection refers to a point (that is, an apex) where two adjacent sides of a polygon intersect with each other. Further, in the present specification, a position other than the intersection of a polygon or a polygonal patch refers to a position inside the polygon or the polygonal patch (in the polygon). The inside of the polygon (in the polygon) also includes a side of the polygon.

Figure 1:
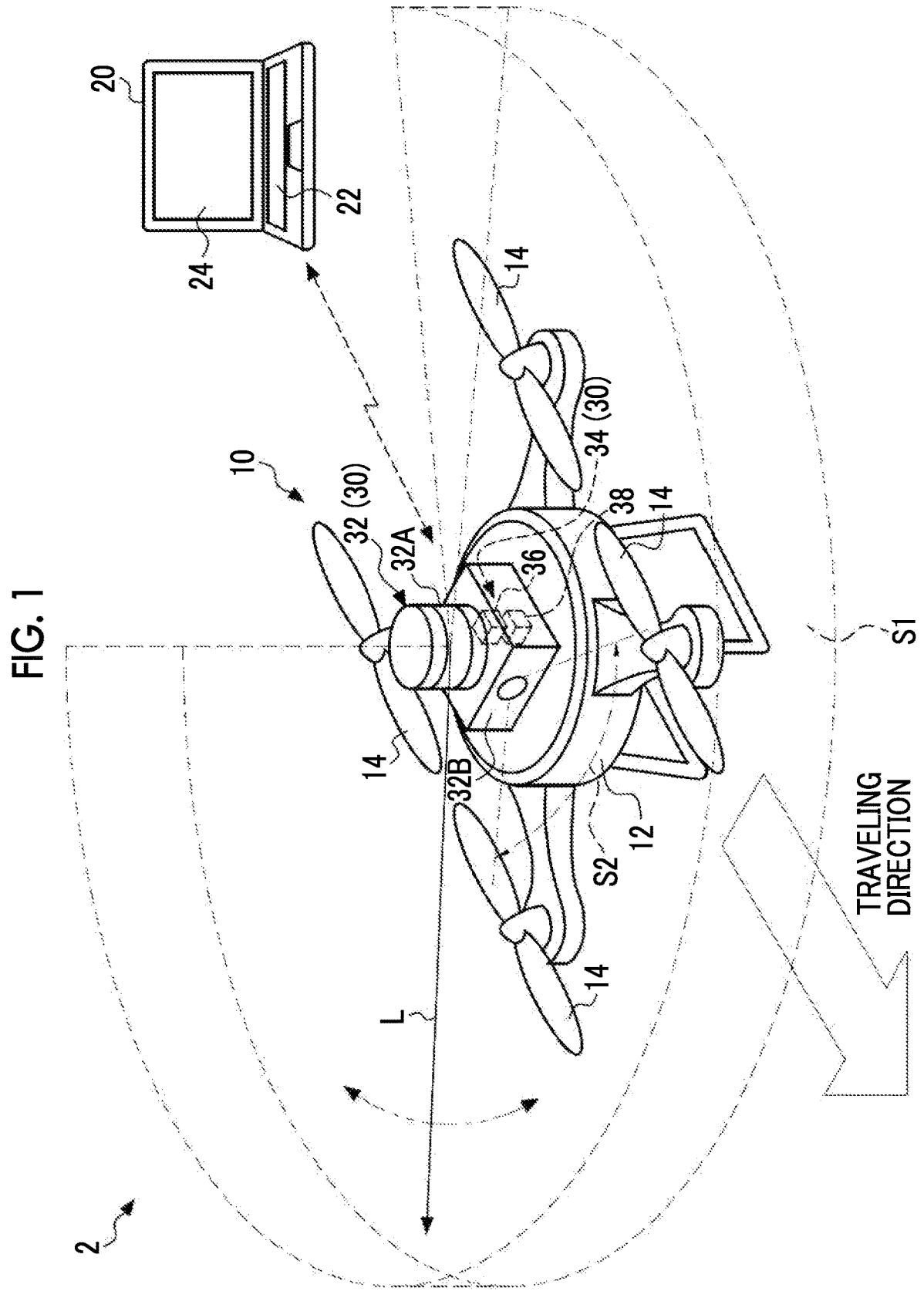
FIG. 1 is a schematic configuration diagram showing an example of an overall configuration of a movable object system.

For example, as shown in FIG. 1, an information processing system 2 includes a movable object 10 and an information processing apparatus 20. A sensor unit 30 is mounted on the movable object 10. An example of the movable object 10 is an unmanned movable object. In the example shown in FIG. 1, an unmanned aerial vehicle (for example, a drone) is shown as an example of the movable object 10.

The movable object 10 is used for surveying and/or checking of land, infrastructure, and/or the like. Examples of the infrastructure include road equipment (for example, a bridge, a road surface, a tunnel, a guard rail, a traffic light, and/or a windproof windshield), water passage equipment, airport equipment, harbor equipment, water storage equipment, gas equipment, power supply equipment, medical equipment, and/or fire equipment.

Here, while the unmanned aerial vehicle is exemplified as an example of the movable object 10, the technique of the present disclosure is not limited thereto. For example, the movable object 10 may be a vehicle. Examples of the vehicle include a vehicle with a gondola, an aerial work vehicle, a bridge inspection vehicle, and the like. Further, the movable object 10 may be a slider, a carriage, or the like on which the sensor unit 30 can be mounted. Furthermore, the movable object 10 may be a person. Here, a person refers to, for example, a worker who carries the sensor unit 30 and operates the sensor unit 30 to perform surveying and/or inspection of the land and/or infrastructure.

The information processing apparatus 20 is a laptop personal computer. Here, the laptop personal computer is exemplified, but this is merely an example, and a desktop-type personal computer may be applied. Further, the information processing apparatus 20 is not limited to a personal computer, and may be a server. The server may be a mainframe used on-premises together with the movable object 10 or may be an external server implemented by cloud computing. Further, the server may be an external server implemented by network computing such as fog computing, edge computing, or grid computing.

The information processing apparatus 20 includes a reception device 22 and a display 24. The reception device 22 includes a keyboard, a mouse, a touch panel, and the like and receives an instruction from a user. The display 24 displays various pieces of information (for example, an image and text). Examples of the display 24 include an EL display (for example, an organic EL display or an inorganic EL display). It should be noted that the display is not limited to the EL display, and another type of display, such as a liquid-crystal display, may be applied.

The movable object 10 is connected to the information processing apparatus 20 so as to be capable of wireless communication, and various types of information are wirelessly exchanged between the movable object 10 and the information processing apparatus 20.

The movable object 10 includes a body 12 and a plurality of propellers 14 (four propellers in the example shown in FIG. 1). The movable object 10 flies or hovers in a three-dimensional space by controlling the rotation of each of the plurality of propellers 14.

The sensor unit 30 is attached to the body 12. In the example shown in FIG. 1, the sensor unit 30 is attached to an upper portion of the body 12. However, this is merely an example, and the sensor unit 30 may be attached to a location other than the upper portion of the body 12 (for example, a lower portion of the body 12).

The sensor unit 30 includes an external sensor 32 and an internal sensor 34. The external sensor 32 senses an outside environment of the movable object 10. The external sensor 32 has a LiDAR 32A and a camera 32B. The LiDAR 32A is an example of a "three-dimensional distance-measuring sensor" according to the technique of the present disclosure, and the camera 32B is an example of an "imaging apparatus" according to the technique of the present disclosure.

The LiDAR 32A scans a surrounding space by emitting a pulsed laser beam L to the surroundings. The laser beam L is, for example, visible light or infrared light. The LiDAR 32A receives reflected light of the laser beam L reflected from an object (for example, a natural object and/or an artificial object) present in the surrounding space, and measures a time from emission of the laser beam L to reception of the reflected light, thereby calculating a distance to a measurement point in the object. Here, the measurement point refers to a reflection point of the laser beam L in the object. Further, whenever the LiDAR 32A scans the surrounding space, the LiDAR 32A outputs point cloud data representing a plurality of three-dimensional coordinates as positional information capable of specifying positions of a plurality of measurement points. The point cloud data is also referred to as a point cloud. The point cloud data is, for example, data represented by three-dimensional rectangular coordinates.

The LiDAR 32A emits the laser beam L to a visual field range S1 of, for example, 135 degrees to the left and right and 15 degrees to upper and lower sides, with respect to a traveling direction of the movable object 10. The LiDAR 32A emits the laser beam L to the entire visual field range S1 while changing the angle by 0.25 degrees in either direction of a left-right direction or an up-down direction, for example. The LiDAR 32A repeatedly scans the visual field range S1 and outputs the point cloud data for each scan. Hereinafter, for convenience of description, the point cloud data, which is output by the LiDAR 32A every scan, is referred to as segmented point cloud data PG (refer to FIG. 3).

The camera 32B is a digital camera having an image sensor. Here, the image sensor refers to, for example, a CMOS image sensor or a CCD image sensor. The camera 32B performs imaging in a visual field range S2 in response to an instruction which is given from the outside (for example, the information processing apparatus 20). Examples of the imaging performed by the camera 32B include imaging for a motion picture image (for example, imaging performed at a predetermined frame rate, such as 30 frames/sec or 60 frames/sec) and imaging for a still image. The imaging for the motion picture image and the imaging for the still image performed by the camera 32B are selectively performed in response to the instruction which is given to the camera 32B from the outside.

A sampling resolution (for example, a density of pixels per unit area of the captured image which is captured through imaging performed by the camera 32B) of the camera 32B is higher than a sampling resolution (for example, a density of distance measurement points per unit area of point cloud data) of the LiDAR 32A. Further, in the information processing apparatus 20, a positional relationship between the LiDAR 32A and the camera 32B is given.

It should be noted that, for convenience of description, description will be hereinafter given on the premise that the LiDAR 32A and the camera 32B remains stationary with respect to the movable object 10. Further, for convenience of description, description will be hereinafter given on the following condition. The visual field range S1 includes the visual field range S2 (that is, the visual field range S2 is a part of the visual field range S1), a position of the visual field range S2 remains stationary with respect to the visual field range S1, and a position of the visual field range S2 with respect to the visual field range S1 is given. Further, here, for convenience of description, it is exemplified that the visual field range S1 includes the visual field range S2, but this is merely an example. For example, the visual field range S2 may include the visual field range S1 (that is, the visual field range S1 may be a part of the visual field range S2). Specifically, the visual field range S1 and the visual field range S2 may overlap each other such that a plurality of pieces of the segmented point cloud data PG with which texture mapping processing (refer to FIG. 11) to be described later can be realized and the captured image can be obtained.

The internal sensor 34 has an acceleration sensor 36 and an angular velocity sensor 38. The internal sensor 34 detects a physical amount necessary for specifying a movement direction, a movement distance, a posture, and the like of the movable object 10, and outputs detection data indicating the detected physical amount. The detection data which is obtained by the internal sensor 34 (hereinafter, also simply referred to as "detection data") is, for example, acceleration data indicating an acceleration detected by the acceleration sensor 36 and acceleration data indicating an angular velocity detected by the angular velocity sensor 38.

The movable object 10 has a LiDAR coordinate system and a three-dimensional camera coordinate system. The LiDAR coordinate system is a three-dimensional coordinate system (here, as an example, an orthogonal coordinate system of a three-dimensional space) applied to the LiDAR 32A. The three-dimensional camera coordinate system is a three-dimensional coordinate system (here, as an example, an orthogonal coordinate system of a three-dimensional space) applied to the camera 32B.

Figure 2:
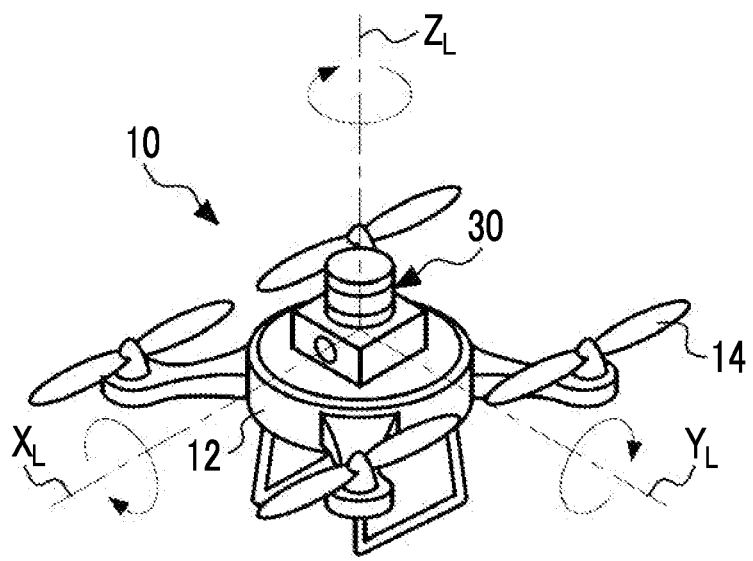
FIG. 2 is a schematic perspective view showing an example of a detection axis of an acceleration sensor and an angular velocity sensor.

As shown in FIG. 2 as an example, the orthogonal coordinate system of the three-dimensional space applied to the LiDAR 32A, that is, the LiDAR coordinate system, is determined by an $X_L$ axis, a $Y_L$ axis, and a $Z_L$ axis, which are orthogonal to each other. The point cloud data is defined by the LiDAR coordinate system.

The acceleration sensor 36 (refer to FIG. 1) detects an acceleration applied in each direction of the $X_L$ axis, the $Y_L$ axis, and the $Z_L$ axis. The angular velocity sensor 38 (refer to FIG. 1) detects an angular velocity applied around each axis (that is, each of a roll direction, a pitch direction, and a yaw direction) of the $X_L$ axis, the $Y_L$ axis, and the $Z_L$ axis. That is, the internal sensor 34 is a six-axis inertia measurement sensor.

Figure 3:
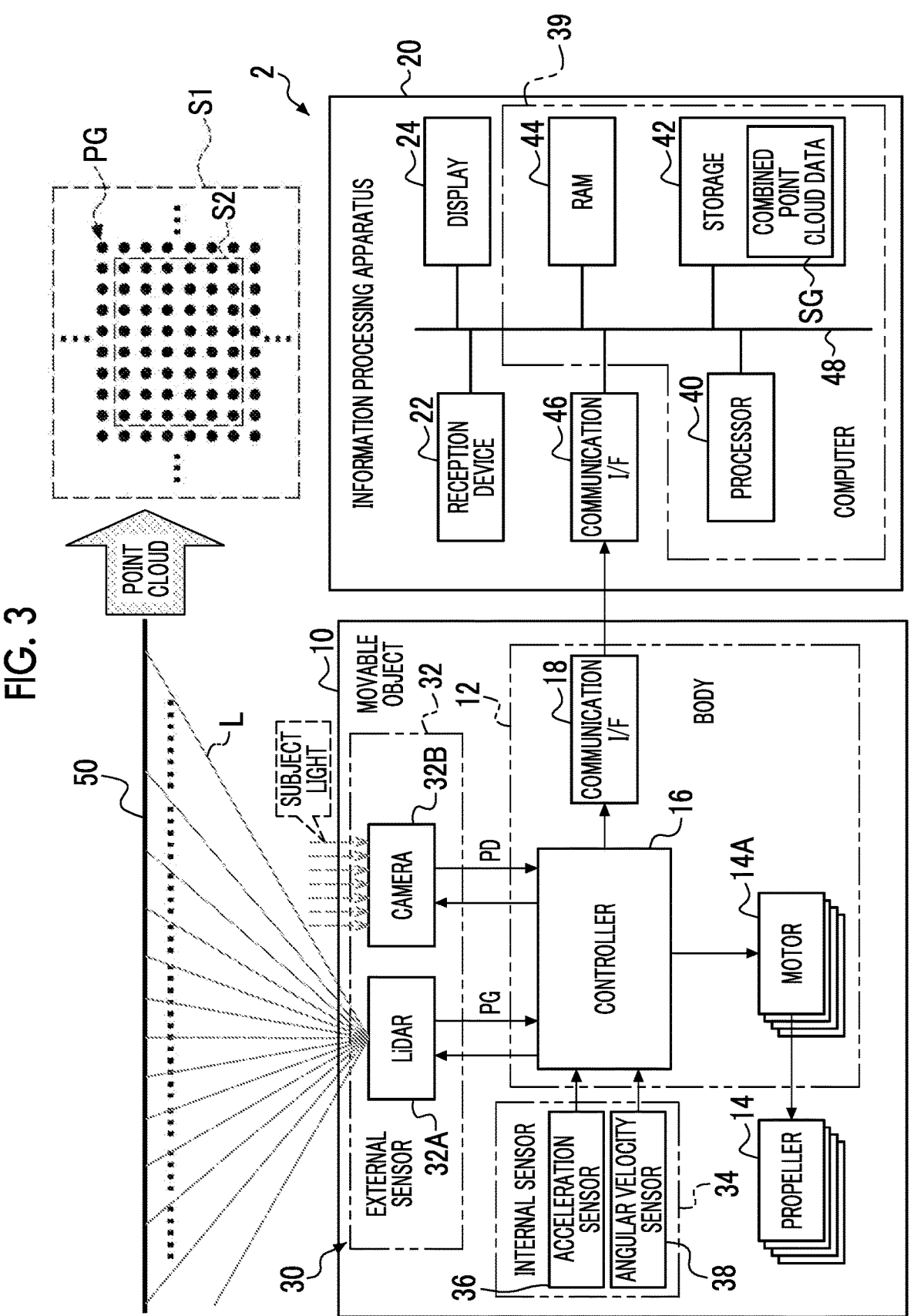
FIG. 3 is a block diagram showing an example of a hardware configuration of an information processing system.

For example, as shown in FIG. 3, the body 12 of the movable object 10 is provided with a controller 16, a communication I/F 18, and motors 14A. The controller 16 is realized by, for example, an IC chip. The body 12 is provided with a plurality of motors 14A. The plurality of motors 14A are connected to the plurality of propellers 14. The controller 16 controls flight of the movable object 10 by controlling the plurality of motors 14A. Further, the controller 16 controls a scanning operation of the laser beam L by the LiDAR 32A.

The external sensor 32 outputs, as a result of sensing an object 50, which is an example of the outside environment, segmented point cloud data PG, which is obtained by scanning the visual field range S1 with the laser beam L through the LiDAR 32A, and a captured image PD, which is captured through imaging of subject light (that is, reflected light indicating a part of the object 50 included in the visual field range S2) indicating the visual field range S2 with the camera 32B, to the controller 16. The controller 16 receives the segmented point cloud data PG and the captured image PD from the external sensor 32.

The internal sensor 34 outputs detection data, which is obtained by performing sensing (for example, acceleration data obtained by the acceleration sensor 36 and angular velocity data obtained by the angular velocity sensor 38), to the controller 16. The controller 16 receives the detection data from the internal sensor 34.

The controller 16 wirelessly transmits the received segmented point cloud data PG, the received captured image PD, and the received detection data to the information processing apparatus 20 via the communication I/F 18.

The information processing apparatus 20 includes a computer 39 and a communication I/F 46, in addition to the reception device 22 and the display 24. The computer 39 has a processor 40, a storage 42, and a RAM 44. The reception device 22, the display 24, the processor 40, the storage 42, the RAM 44, and the communication I/F 46 are connected to a bus 48. It should be noted that the information processing apparatus 20 is an example of the "image processing device" according to the technique of the present disclosure. The computer 39 is an example of the "computer" according to the technique of the present disclosure. Moreover, the processor 40 is an example of the "processor" according to the technique of the present disclosure. Further, the storage 42 and the RAM 44 are examples of the "memory" according to the technique of the present disclosure.

The processor 40 has, for example, a CPU and a GPU, and controls the entire information processing apparatus 20. The GPU operates under the control of the CPU, and is responsible for executing screen display and/or image processing. In addition, the processor 40 may be one or more CPUs with which the functions of the GPU have been integrated or may be one or more CPUs with which the functions of the GPU have not been integrated.

The storage 42 is a non-volatile storage device that stores various programs, various parameters, and the like. Examples of the storage 42 include an HDD and an SSD. It should be noted that the HDD and the SSD are merely examples. A flash memory, a magnetoresistive memory, and/or a ferroelectric memory may be used instead of the HDD and/or the SSD or together with the HDD and/or the SSD.

The RAM 44 is a memory in which information is temporarily stored, and is used as a work memory by the processor 40. Examples of the RAM 44 include a DRAM and/or an SRAM.

The communication I/F 46 performs wireless communication with the communication I/F 18 of the movable object 10 to receive a plurality of pieces of the segmented point cloud data PG from the movable object 10. The plurality of pieces of the segmented point cloud data PG received by the communication I/F 46 indicate a plurality of pieces of the segmented point cloud data PG having different timings acquired by the LiDAR 32A (that is, a plurality of pieces of the segmented point cloud data PG obtained by a plurality of scans). Further, the communication I/F 46 wirelessly communicates with the communication I/F 18 of the movable object 10 to receive the detection data and the captured image PD obtained by the internal sensor 34 at each timing at which each of the plurality of pieces of the segmented point cloud data PG is acquired. In such a manner, the processor 40 acquires and processes the segmented point cloud data PG, the captured image PD, and the detection data received by the communication I/F 46.

The processor 40 acquires combined point cloud data SG on the basis of the plurality of pieces of the segmented point cloud data PG which are received from the movable object 10. Specifically, the processor 40 generates the combined point cloud data SG by performing combination processing of combining the plurality of pieces of the segmented point cloud data PG which are received from the movable object 10. The combined point cloud data SG is an aggregate of the plurality of pieces of the segmented point cloud data PG obtained by scanning with respect to the visual field range SI, and is stored in the storage 42 by the processor 40. The plurality of pieces of the segmented point cloud data PG are an example of "distance measurement results of the three-dimensional distance-measuring sensor for a plurality of measurement points" according to the technique of the present disclosure. The combined point cloud data SG is an example of the "three-dimensional coordinates of the three-dimensional distance-measuring sensor system" according to the technique of the present disclosure.

Figure 4:
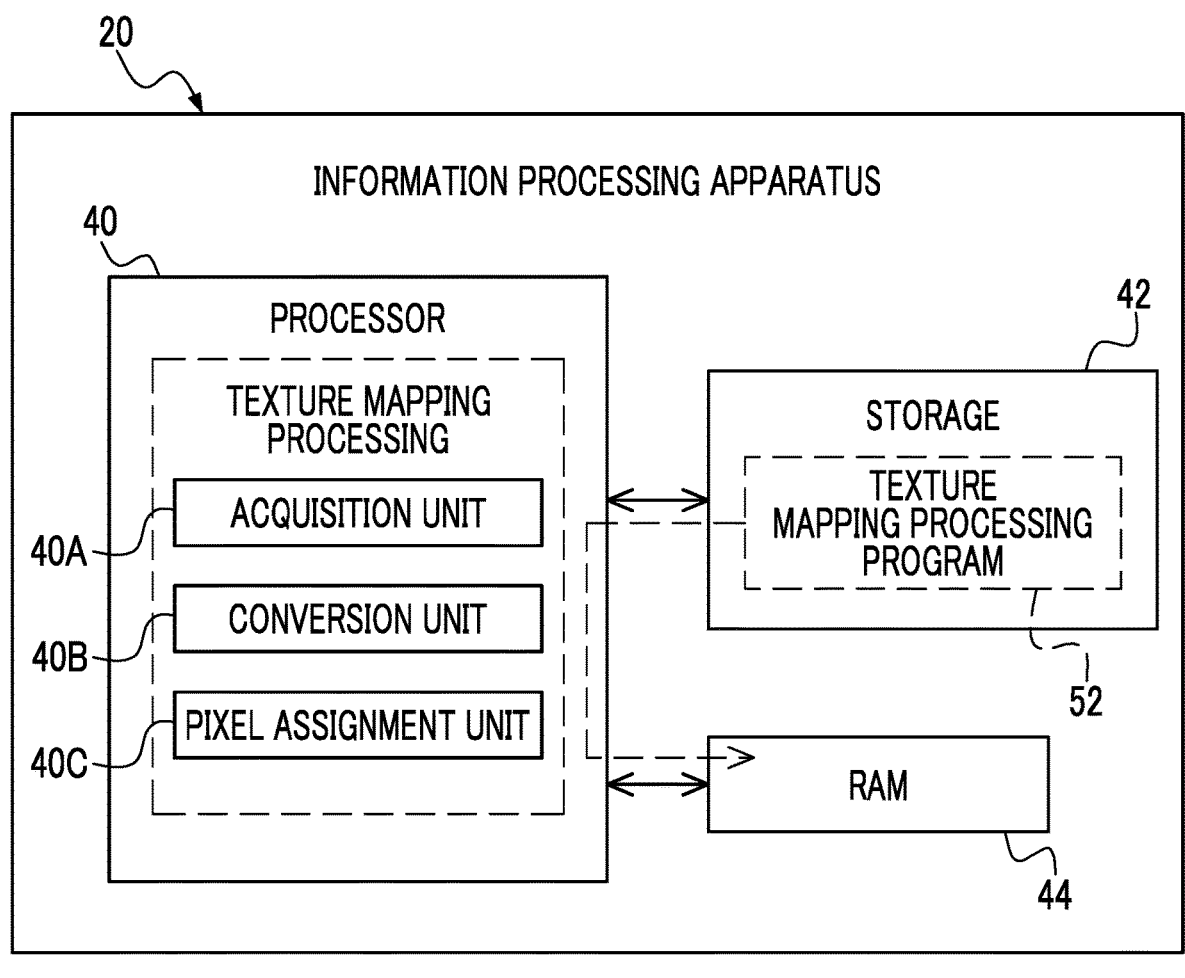
FIG. 4 is a block diagram showing an example of functions of a main unit of a processor.

As shown in FIG. 4 as an example, the storage 42 stores a texture mapping processing program 52. The texture mapping processing program 52 is an example of the "program" according to the technique of the present disclosure. The processor 40 reads out the texture mapping processing program 52 from the storage 42, and executes the read-out texture mapping processing program 52 on the RAM 44. The processor 40 performs texture mapping processing in accordance with the texture mapping processing program 52 which is executed on the RAM 44 (refer to FIG.

11). The processor 40 executes the texture mapping processing program 52 to operate as an acquisition unit 40A, a conversion unit 40B, and a pixel assignment unit 40C.

Figure 5:
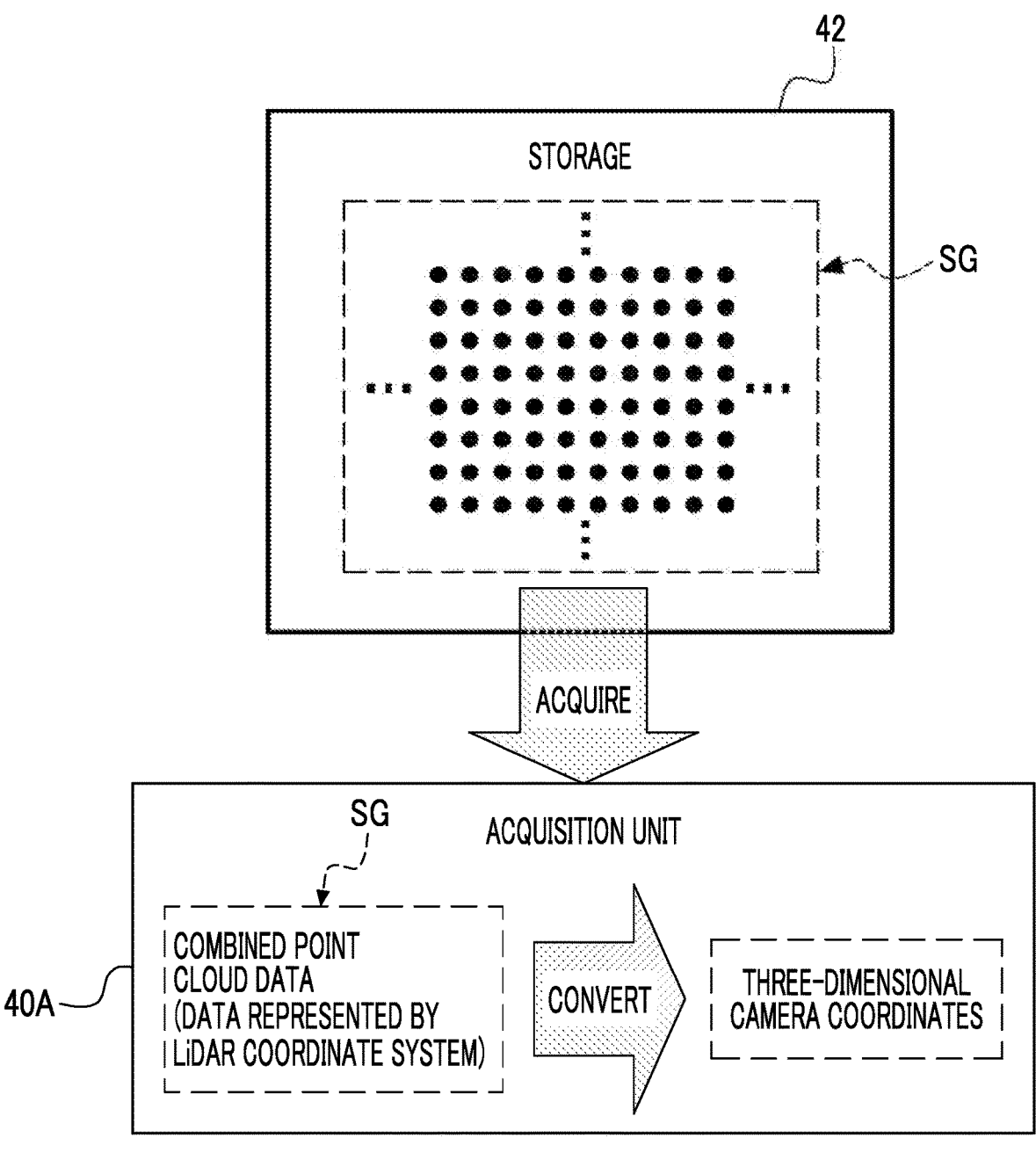
FIG. 5 is a conceptual diagram showing an example of contents of processing of an acquisition unit.

For example, as shown in FIG. 5, the acquisition unit 40A acquires the combined point cloud data SG from the storage 42. Then, the acquisition unit 40A acquires three-dimensional camera coordinates, which are defined in the three-dimensional camera coordinate system, on the basis of the combined point cloud data SG. Here, the acquisition of the three-dimensional camera coordinates performed by the acquisition unit 40A is implemented by converting the combined point cloud data SG into the three-dimensional camera coordinates through the acquisition unit 40A. Here, the three-dimensional camera coordinates are an example of the "three-dimensional coordinates of the imaging apparatus system" according to the technique of the present disclosure.

Figure 6:
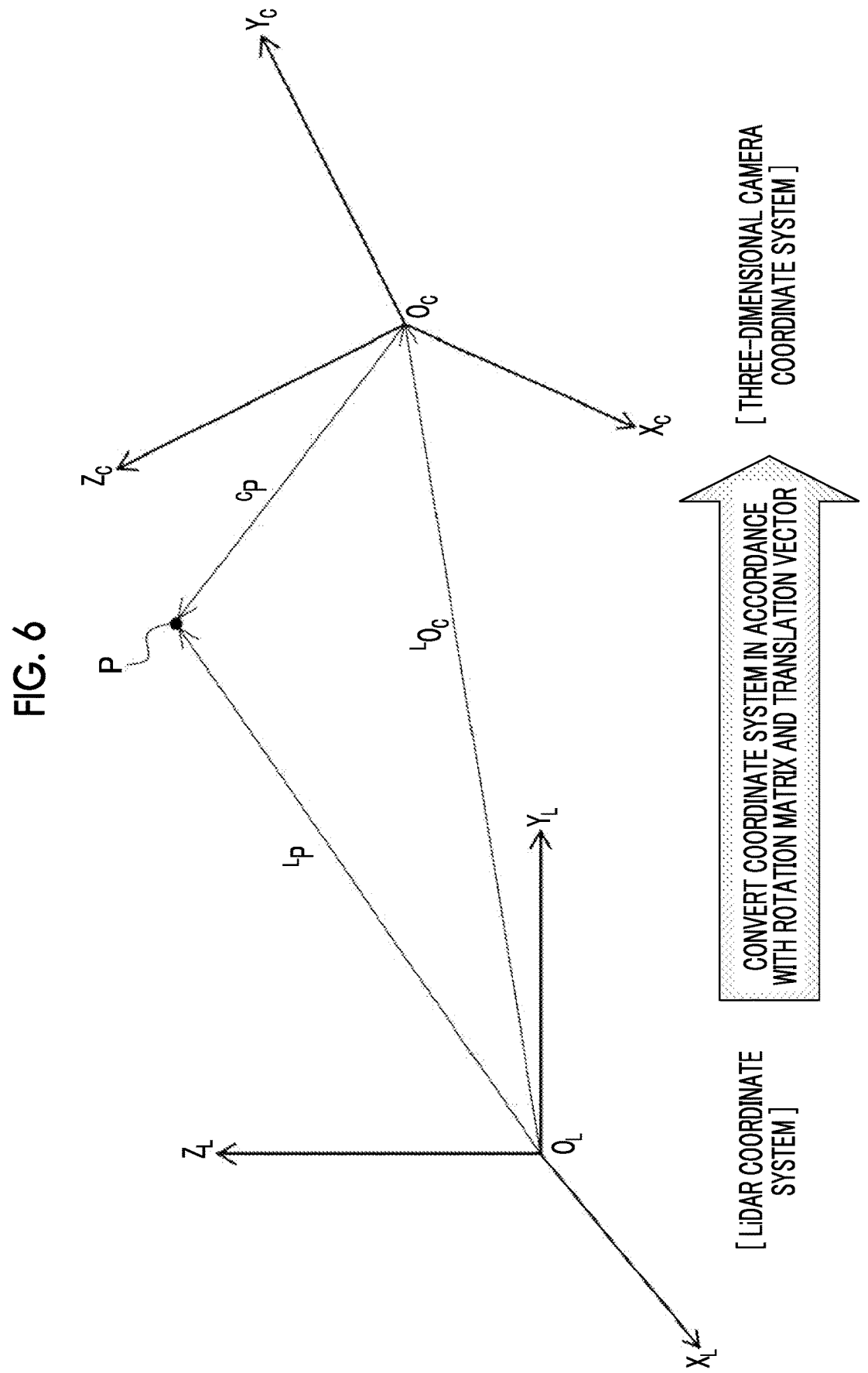
FIG. 6 is a conceptual diagram showing an example of an aspect in which a LiDAR coordinate system is converted into a three-dimensional camera coordinate system.

As shown in FIG. 6 as an example, the conversion of the combined point cloud data SG into the three-dimensional camera coordinates is realized by converting the LiDAR coordinate system into the three-dimensional camera coordinate system in accordance with a rotation matrix and a translation vector. In the example shown in FIG. 6, an example of the following aspect is shown. The three-dimensional coordinates (hereinafter, also referred to as "LiDAR coordinates"), which are data for specifying a position of one measurement point P in the combined point cloud data SG, are converted into three-dimensional camera coordinates.

Here, it is assumed that three axes of the LiDAR coordinate system are the $X_L$ axis, the $Y_L$ axis, and the $Z_L$ axis and that the rotation matrix necessary for conversion from the LiDAR coordinate system to the three-dimensional camera coordinate system is $^{C}_{L}R$. The movable object 10 is rotated together with the LiDAR coordinate system by an angle $\varphi$, an angle $\theta$, and an angle $\psi$, respectively, around the $X_L$ axis of the LiDAR coordinate system, around the $Y_L$ axis of the LiDAR coordinate system, and around the $Z_L$ axis of the LiDAR coordinate system, in this order. In such a case, the rotation matrix $^{C}_{L}R$ representing the conversion of the position of the movable object 10 is represented by the following matrix (1). The angle $\varphi$, the angle $\theta$, and the angle $\Psi$ are calculated on the basis of the angular velocity data included in the detection data.

[Numerical Expression 1]

$$^{C}_{L}R = \begin{bmatrix} \cos\psi\cos\theta\cos\phi - \sin\psi\sin\phi & -\sin\psi\cos\theta\cos\phi - \cos\psi\sin\phi & \sin\theta\cos\phi \\ \cos\psi\cos\theta\sin\phi + \sin\psi\cos\phi & -\sin\psi\cos\theta\sin\phi + \cos\psi\cos\phi & \sin\theta\sin\phi \\ -\cos\psi\sin\theta & \sin\psi\sin\theta & \cos\theta \end{bmatrix} \quad (1)$$

An origin of the LiDAR coordinate system is represented as $O_L$, an origin of the three-dimensional camera coordinate system is represented as $O_C$, and the three axes of the three-dimensional camera coordinate system are represented as an $X_C$ axis, a $Y_C$ axis, and a $Z_C$ axis. In addition, the three-dimensional coordinates of the measurement point P in the LiDAR coordinate system (that is, the LiDAR three-dimensional coordinates) are represented as $^{L}P$, the three-dimensional coordinates of the measurement point P in the three-dimensional camera coordinate system (that is, the three-dimensional camera coordinates) are represented as $^{C}P$, the translation vector necessary for conversion from the LiDAR coordinate system into the three-dimensional camera coordinate system is represented as $^{C}_{L}T$, and a position of the origin $O_L$ is represented as $^{L}O_C$ in the LiDAR coordinate system. The three-dimensional camera coordinates $^C$P can be represented by Numerical Expression (2). In addition, the translation vector $^C_L$T is calculated on the basis of the acceleration data which is included in the detection data.

[Numerical Expression 2]

$$^C P = {}^C_L R({}^L P - {}^L O_C) \tag{2}$$
$$= {}^C_L R {}^L P - {}^C_L R {}^L O_C$$

Here, the relationship of $^C_L$T, $^C_L$R, and $^L O_C$ is represented by Numerical Expression (3). Therefore, Numerical Expression (3) is substituted into Numerical Expression (2) such that the three-dimensional camera coordinates $^C$P are represented by Numerical Expression (4). The combined point cloud data SG including the LiDAR coordinates relating to the measurement point P is converted into a plurality of three-dimensional camera coordinates using Numerical Expression (4).

[Numerical Expression 3]

$$_L {}^C T = -{}^C_L R {}^L O_C \tag{3}$$

[Numerical Expression 4]

$$^C P = {}^C_L R {}^L P + {}_L {}^C T \tag{4}$$

Figure 7:
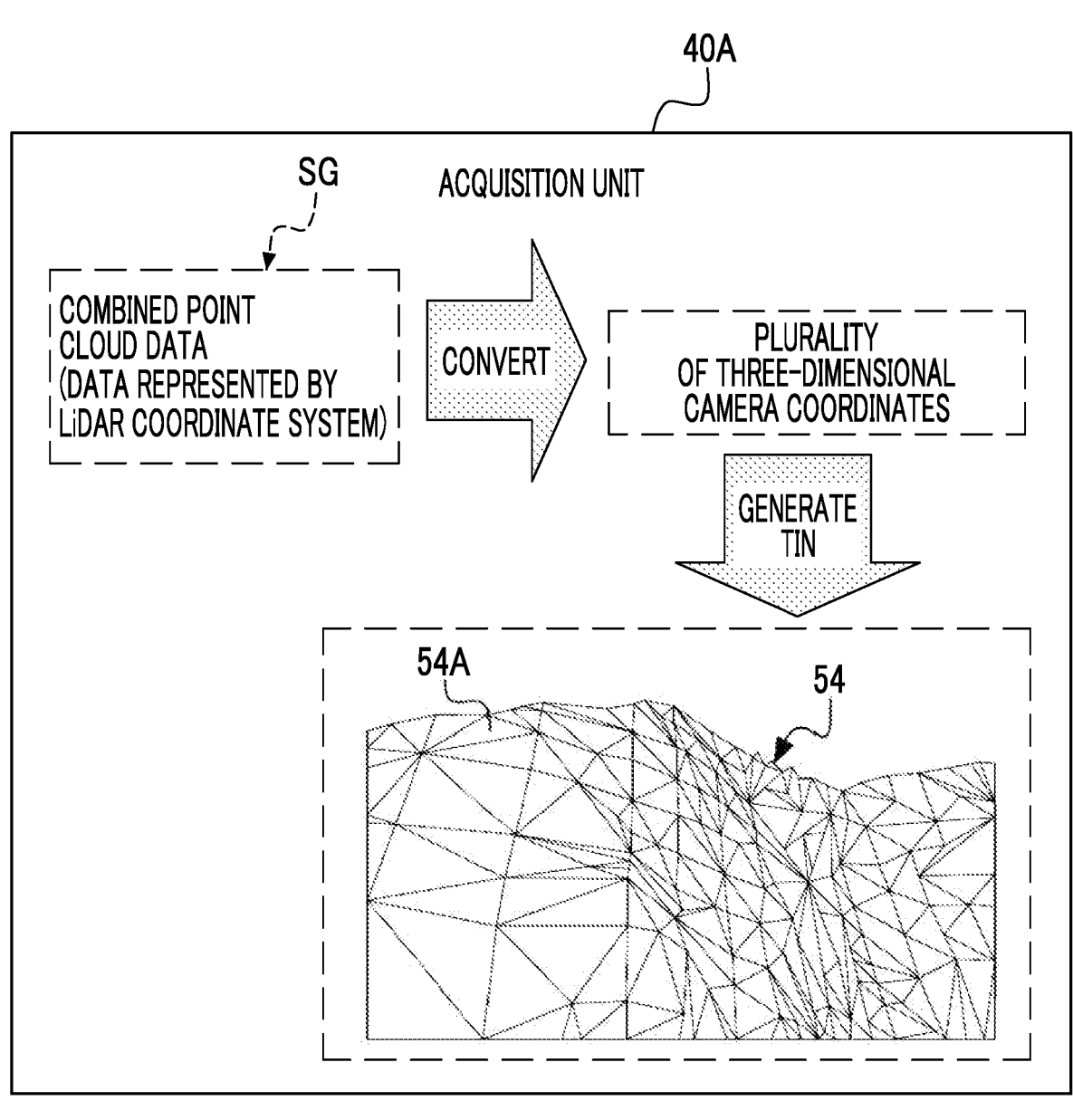
FIG. 7 is a conceptual diagram showing an example of contents of the processing of the acquisition unit.

As shown in FIG. 7 as an example, in order to express the plurality of three-dimensional camera coordinates obtained by converting the combined point cloud data SG using Numerical Expression (4) in a digital data structure, the acquisition unit 40A generates a TIN 54 on the basis of the plurality of three-dimensional camera coordinates. The TIN 54 is a digital data structure indicating an aggregate of triangular patches 54A which are defined by a triangular mesh (for example, an irregular triangular network). The plurality of three-dimensional camera coordinates define positions of intersections of a plurality of triangular patches 54A included in the TIN 54 (in other words, apexes of the respective triangular patches 54A). The triangular patch 54A is an example of the "polygonal patch" according to the technique of the present disclosure. Here, the triangular patch 54A is exemplified, but this is merely an example, and a patch having a polygonal shape other than a triangle may be used. That is, instead of the TIN 54, a polygonal aggregate patch having a surface structure in which a plurality of patches having polygonal shapes are aggregated may be applied.

As shown shown in FIG. 8 as an example, the conversion unit 40B converts the plurality of three-dimensional camera coordinates, which are used in the TIN 54, into a plurality of two-dimensional coordinates (hereinafter, also referred to as "two-dimensional camera coordinates") capable of specifying a position in the captured image PD. Further, the conversion unit 40B converts the plurality of three-dimensional camera coordinates, which are used in the TIN 54, into a plurality of two-dimensional coordinates (hereinafter, also referred to as "two-dimensional screen coordinates") capable of specifying a position on a screen of the display 24. Here, the two-dimensional camera coordinates are an example of the "two-dimensional coordinates of the imaging apparatus system" according to the technique of the present disclosure. The two-dimensional screen coordinates are an example of the "two-dimensional coordinates of the display system" according to the technique of the present disclosure.

Figure 9:
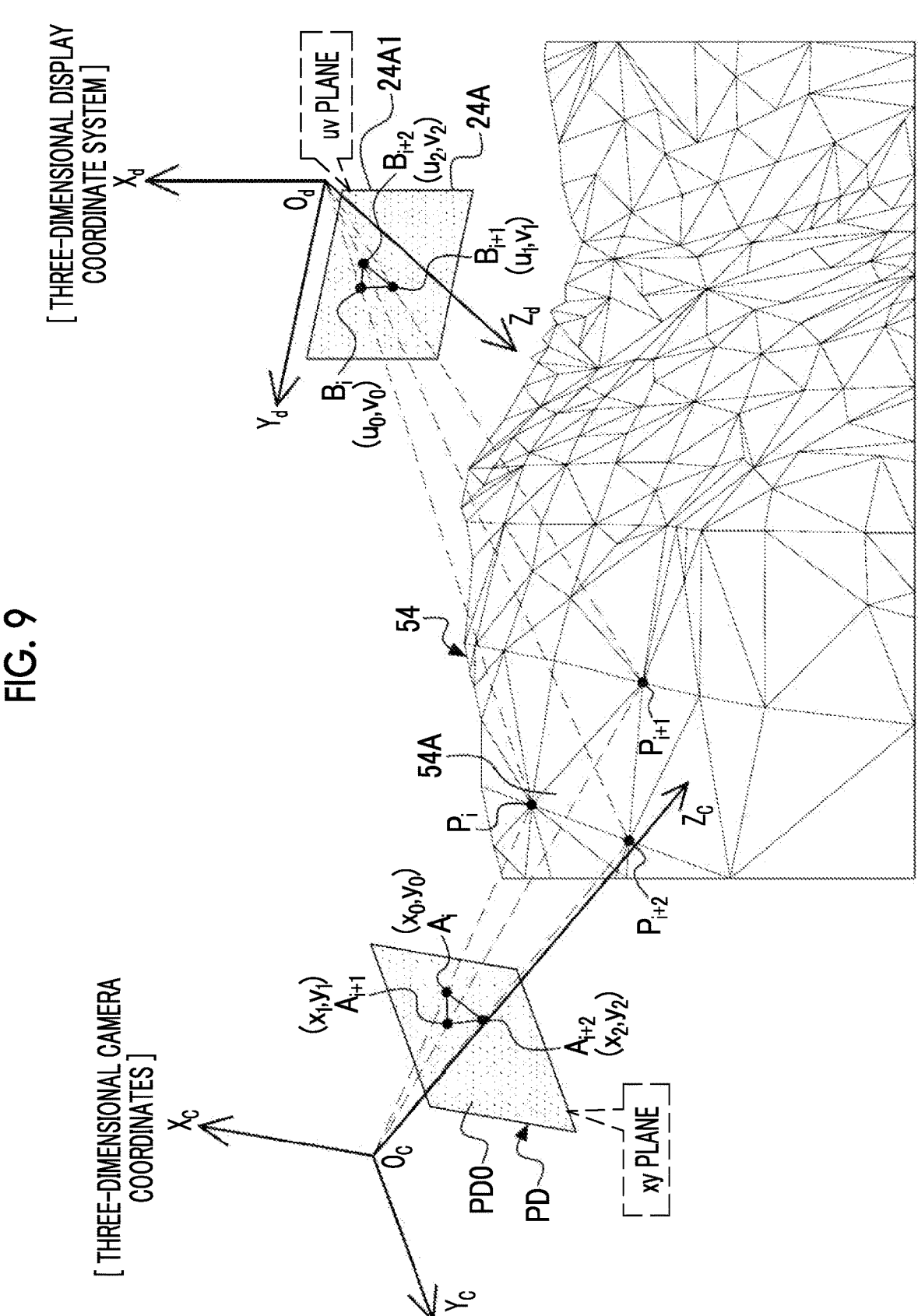
FIG. 9 is a conceptual diagram showing an example of an aspect in which three-dimensional camera coordinates are projected in perspective onto an xy plane and a uv plane.

As shown in FIG. 9 as an example, the position of each pixel constituting the captured image PD is specified by coordinates in an xy plane PD0 (in the example shown in FIG. 9, a plane corresponding to an imaging plane away from the origin $O_C$ in a direction of the $Z_C$ axis by a focal length) corresponding to an imaging plane of the image sensor of the camera 32B (refer to FIGS. 1 and 3). The xy plane PD0 is a plane that can be represented by a two-dimensional coordinate system (hereinafter, also referred to as a "two-dimensional camera coordinate system") defined by the x axis and the y axis, and positions of pixels constituting the captured image PD are specified by the two-dimensional camera coordinates (x, y). Here, assuming that i=0, 1, 2, . . . , and n, positions $A_i$, $A_{i+1}$, and $A_{i+2}$ of the pixels in the xy plane PD0 correspond to positions $P_i$, $P_{i+1}$, and $P_{i+2}$ of the three apexes of the triangular patch 54A. The two-dimensional camera coordinates $(x_0, y_0)$, $(x_1, y_1)$, and $(x_2, y_2)$ of the positions $A_i$, $A_{i+1}$, and $A_{i+2}$ are obtained by projecting, in perspective, the three-dimensional camera coordinates of each of the positions $P_i$, $P_{i+1}$, and $P_{i+2}$ onto the xy plane PD0.

In the example shown in FIG. 9, assuming that an origin is set as $O_d$, a three-dimensional display coordinate system having an $X_d$ axis, a $Y_d$ axis, and a $Z_d$ axis orthogonal to each other is shown. The three-dimensional display coordinates are three-dimensional coordinates applied to the display 24 (refer to FIGS. 1 and 3). A screen 24A is set in the three-dimensional display coordinate system. The screen 24A is a screen of the display 24, and displays an image showing the object 50. For example, the image, which is displayed on the screen 24A, is a texture image. Here, the texture image refers to an image in which the captured image PD captured through imaging performed by the camera 32B is texture-mapped on the screen 24A.

A position and an orientation of the screen 24A, which are set with respect to the three-dimensional display coordinate system, are changed in response to an instruction received by the reception device 22 (refer to FIG. 3), for example. The position of each pixel constituting the screen 24A is specified by coordinates in a uv plane 24A1 (in the example shown in FIG. 9, a plane away from the origin $O_d$ in a direction of the $Z_d$ axis by the distance corresponding to the focal length). The uv plane 24A1 is a plane that can be represented by a two-dimensional coordinate system (hereinafter, also referred to as a "two-dimensional screen coordinate system") defined by a u axis and a v axis. The position of each pixel constituting the screen 24A, that is, the position on the screen of the display 24, is specified by the two-dimensional screen coordinates (u, v).

Figure 10:
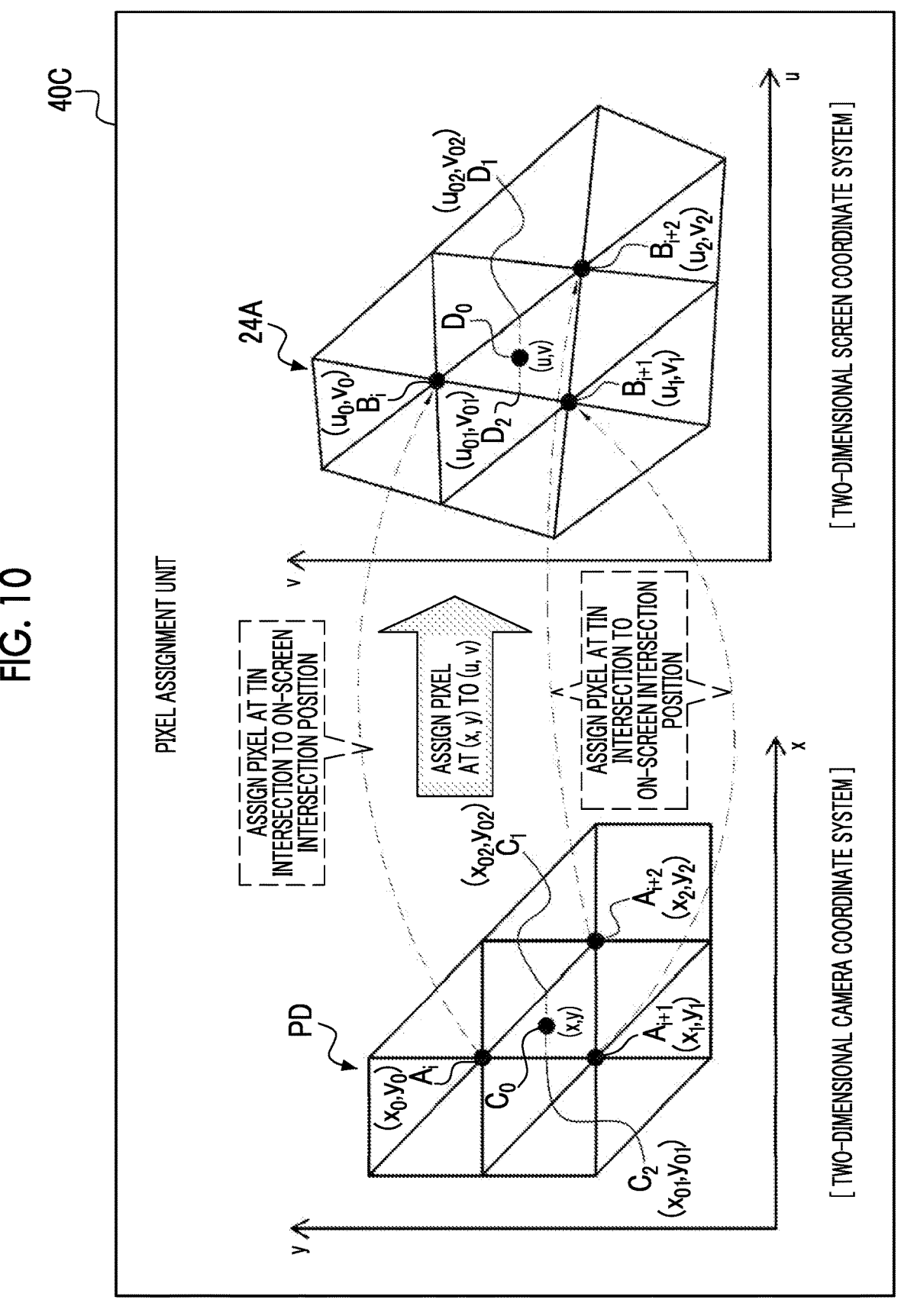
FIG. 10 is a conceptual diagram showing an example of contents of processing of a pixel assignment unit.

In the example shown in FIG. 10, positions $B_i$, $B_{i+1}$, and $B_{i+2}$ of the pixels in the uv plane 24A1 correspond to the positions $P_i$, $P_{i+1}$, and $P_{i+2}$ of the three apexes of the triangular patch 54A. The two-dimensional screen coordinates $(u_0, v_0)$, $(u_1, v_1)$, and $(u_2, v_2)$ of the positions $B_i$, $B_{i+1}$, and $B_{i+2}$, are obtained by projecting the three-dimensional camera coordinates of the positions $P_i$, $P_{i+1}$, and $P_{i+2}$ onto the uv plane 24A1.

As shown in FIG. 10 as an example, the pixel assignment unit 40C assigns a pixel at a position which corresponds to a position of the intersection of the plurality of triangular patches 54A (refer to FIGS. 7 to 9) included in the TIN 54, among a plurality of pixels (for example, all pixels) included in the captured image PD, to the on-screen intersection position, and thereby creates a three-dimensional image (that is, a texture image perceived three-dimensionally by a user through the screen 24A). The on-screen intersection position is defined as a position corresponding to a position of an intersection of a plurality of triangular patches 54A (refer to FIGS. 7 to 9) included in the TIN 54, among a plurality of pixels (for example, all pixels) included on the screen 24A. In the example shown in FIG. 10, among a plurality of pixels included in the captured image PD, each of the pixels at the positions $A_i$, $A_{i+1}$, and $A_{i+2}$ (that is, positions specified by the two-dimensional camera coordinates $(x_0, y_0)$, $(x_1, y_1)$, and $(x_2, y_2)$) is assigned to the positions $B_i$, $B_{i+1}$, and $B_{i+2}$ on the screen 24A (that is, positions specified by two-dimensional screen coordinates $(u_0, v_0)$, $(u_1, v_1)$, and $(u_2, v_2)$).

In such a manner, among a plurality of pixels included in the captured image PD, pixels at positions corresponding to the positions of the intersections of the plurality of triangular patches 54A included in the TIN 54 are assigned to the corresponding positions on the screen 24A. However, no pixel is assigned to a position other than the intersections (in other words, the apexes of the triangular patches 54A) of the plurality of triangular patches 54A. Therefore, the pixel density of the image to be displayed on the screen 24A decreases to that extent.

Therefore, the pixel assignment unit 40C assigns the pixels constituting the captured image PD to an interpolation position which is specified by an interpolating method using the two-dimensional camera coordinates and the two-dimensional screen coordinates, on the screen 24A. Here, the interpolation position refers to a position corresponding to the position other than the intersection of the triangular patch 54A (in the example shown in FIG. 10, a second interpolation position $D_0$). Examples of the interpolating method include linear interpolation. Examples of the interpolating method other than the linear interpolation include polynomial interpolation, spline interpolation, and the like.

In the example shown in FIG. 10, a first interpolation position $C_0$ is shown as a position corresponding to the position other than the intersection of the triangular patch 54A, among the positions of the plurality of pixels (for example, all pixels) included in the captured image PD. In the example shown in FIG. 10, the second interpolation position $D_0$ is shown as a position corresponding to the position other than the intersection of the triangular patch 54A, among the positions of the plurality of pixels (for example, all the pixels) included on the screen 24A. The second interpolation position $D_0$ is a position corresponding to the first interpolation position $C_0$. In the example shown in FIG. 10, $(x, y)$ is shown as the two-dimensional camera coordinates of the first interpolation position $C_0$, and $(u, v)$ is shown as the two-dimensional screen coordinates of the second interpolation position $D_0$.

The first interpolation position $C_0$ is present inside a triangle (that is, inside a triangular patch formed in the captured image PD) having three apexes at the positions $A_i$, $A_{i+1}$, and $A_{i+2}$, in the captured image PD. For example, the first interpolation position $C_0$ is a position present between a position $C_1$ and a position $C_2$. The position $C_1$ is a position present on a side connecting the positions $A_i$ and $A_{i+2}$ among the three sides of a triangle having three apexes at the positions $A_i$, $A_{i+1}$, and $A_{i+2}$, in the captured image PD. The position $C_2$ is a position present on a side connecting the positions $A_i$ and $A_{i+1}$ among the three sides of a triangle having three apexes at the positions $A_i$, $A_{i+1}$, and $A_{i+2}$, in the captured image PD. The positions $C_1$ and $C_2$ may be determined in response to the instruction received by the reception device 22 (refer to FIG. 3) or may be determined in accordance with a certain internal division ratio applied to a side connecting positions $A_i$ and $A_{i+2}$ and a side connecting positions $A_i$ and $A_{i+1}$.

The two-dimensional camera coordinates of the position $C_1$ are $(x_{02}, y_{02})$, and the two-dimensional camera coordinates of the position $C_2$ are $(x_{01}, y_{01})$. The first interpolation position $C_0$ is specified by the two-dimensional camera coordinates $(x, y)$ interpolated using the two-dimensional camera coordinates $(x_0, y_0)$, $(x_1, y_1)$, $(x_2, y_2)$, $(x_{01}, y_{01})$, and $(x_{02}, y_{02})$.

The second interpolation position $D_0$ is a position which is present inside a triangle having three apexes at the positions $B_i$, $B_{i+1}$, and $B_{i+2}$ (that is, inside the triangular patch formed on the screen 24A), on the screen 24A. For example, the second interpolation position $D_0$ is a position which is present between a position $D_1$ and a position $D_2$. The position $D_1$ is a position present on a side connecting the positions $B_i$ and $B_{i+2}$ among the three sides of the triangle having the three apexes at the positions $B_i$, $B_{i+1}$, and $B_{i+2}$, on the screen 24A. On the screen 24A, the position $D_2$ is present on a side connecting the positions $B_i$ and $B_{i+1}$ among the three sides of the triangle having the three apexes at the positions $B_i$, $B_{i+1}$, and $B_{i+2}$. The position $D_1$ corresponds to the position $C_1$, and the position $D_2$ corresponds to the position $C_2$.

Two-dimensional screen coordinates of the position $D_1$ are $(u_{02}, v_{02})$, and two-dimensional camera coordinates of the position $C_2$ are $(u_{01}, v_{01})$. The second interpolation position $D_0$ is specified from the two-dimensional screen coordinates $(u, v)$ interpolated using the two-dimensional screen coordinates $(u_0, v_0)$, $(u_1, v_1)$, $(u_2, v_2)$, $(u_{01}, v_{01})$, and $(u_{02}, v_{02})$.

Among a plurality of pixels included in the captured image PD, the pixel at the first interpolation position $C_0$, which is specified from the two-dimensional camera coordinates $(x, y)$, can be assigned to the second interpolation position $D_0$, which is specified from the two-dimensional screen coordinates $(u, v)$ by the pixel assignment unit 40C. The pixel at the first interpolation position $C_0$ may be a pixel itself constituting the captured image PD, but the pixel may not be present at a position specified from the two-dimensional camera coordinates $(x, y)$. In such a case, a pixel which is generated by interpolating a plurality of pixels (for example, pixels of three apexes of the positions $A_i$, $A_{i+1}$, and $A_{i+2}$) adjacent to a position specified from the two-dimensional camera coordinates $(x, y)$ may be used as the pixel at the first interpolation position $C_0$.

It is preferable that a resolution of the captured image PD (that is, a resolution of sampling performed by the camera 32B) is higher than a resolution of the combined point cloud data SG (that is, a resolution of sampling performed by the LiDAR 32A) to the extent that the number of pixels in the triangle in the captured image PD (the triangle corresponding to the triangular patch 54A) is equal to or greater than the number of pixels determined in accordance with the resolution of the interpolation processing (for example, processing of specifying the first interpolation position $C_0$ through the interpolating method). Here, the number of pixels determined in accordance with the resolution of the interpolation processing indicates, for example, the number of pixels which are determined in advance such that the number of pixels increases as the resolution of the interpolation processing increases. The resolution of the interpolation processing may be a fixed value determined by, for example, the resolution of the captured image PD and/or of the screen 24A. The resolution of the interpolation processing may be a variable value that is changed in accordance with an instruction which is given from the outside (for example, an instruction received by the reception device 22). The resolution of the interpolation processing may be a variable value that is changed in accordance with the size (for example, the average size) of a triangular patch 54A, a triangle obtained by projecting, in perspective, the triangular patch 54A onto the two-dimensional camera coordinate system, and/or a triangle obtained by projecting, in perspective, the triangular patch 54A onto the two-dimensional screen coordinate system. The resolution of the interpolation processing may depend on the triangular patch 54A or the like. For example, the resolution of the interpolation processing may be set to be higher the larger the triangular patch 54A or the like is, and the resolution of the interpolation processing may be set to be lower the smaller the triangular patch 54A or the like is.

The pixel assignment unit 40C assigns the pixel at the first interpolation position $C_0$ (that is, the pixel at the first interpolation position $C_0$ specified from the two-dimensional camera coordinates (x, y)) to the second interpolation position $D_0$ (that is, the second interpolation position $D_0$ specified from the two-dimensional screen coordinates (u, v)), thereby calculating the two-dimensional screen coordinates (u, v) of the second interpolation position $D_0$ through the interpolating method using Numerical Expressions (5) to (12).

[Numerical Expression 5]

$$x = \frac{(u_{02} - u)x_{01} + (u - u_{01})x_{02}}{u_{02} - u_{01}} \quad (5)$$

[Numerical Expression 6]

$$y = \frac{(v_{02} - u)y_{01} + (u - u_{01})y_{02}}{u_{02} - u_{01}} \quad (6)$$

[Numerical Expression 7]

$$x_{01} = \frac{(v_0 - v)x_1 + (v - v_1)x_0}{v_0 - v_1} \quad (7)$$

[Numerical Expression 8]

$$y_{01} = \frac{(v_0 - v)y_1 + (v - v_1)y_0}{v_0 - v_1} \quad (8)$$

[Numerical Expression 9]

$$x_{02} = \frac{(v_0 - v)x_2 + (v - v_2)x_0}{v_0 - v_2} \quad (9)$$

[Numerical Expression 10]

$$y_{02} = \frac{(v_0 - v)y_2 + (v - v_2)y_0}{v_0 - v_2} \quad (10)$$

[Numerical Expression 11]

$$u_{01} = \frac{(v_0 - v)u_1 + (v - v_1)u_0}{v_0 - v_1} \quad (11)$$

[Numerical Expression 12]

$$u_{02} = \frac{(v_0 - v)u_2 + (v - v_1)u_0}{v_0 - v_2} \quad (12)$$

Next, as an operation of the information processing system 2, the texture mapping processing performed by the processor 40 of the information processing apparatus 20 will be described with reference to FIG. 11.

FIG. 11 shows an example of a flow of the texture mapping processing performed by the processor 40. The flow of the texture mapping processing shown in FIG. 11 is an example of the "image processing method" according to the technique of the present disclosure. In the following, the description will be given on the premise that the combined point cloud data SG is stored in advance in the storage 42.

In the texture mapping processing shown in FIG. 11, first, in Step ST100, the acquisition unit 40A acquires the combined point cloud data SG from the storage 42 (refer to FIG. 5). After the processing in Step ST100 is executed, the texture mapping processing proceeds to Step ST102.

In Step ST102, the acquisition unit 40A converts the combined point cloud data SG into the plurality of three-dimensional camera coordinates (refer to FIGS. 5 and 6). After the processing in Step ST102 is executed, the texture mapping processing proceeds to Step ST104.

In Step ST104, the acquisition unit 40A generates the TIN 54 on the basis of the plurality of three-dimensional camera coordinates (refer to FIG. 7). After the processing in Step ST104 is executed, the texture mapping processing proceeds to Step ST106.

Figure 8:
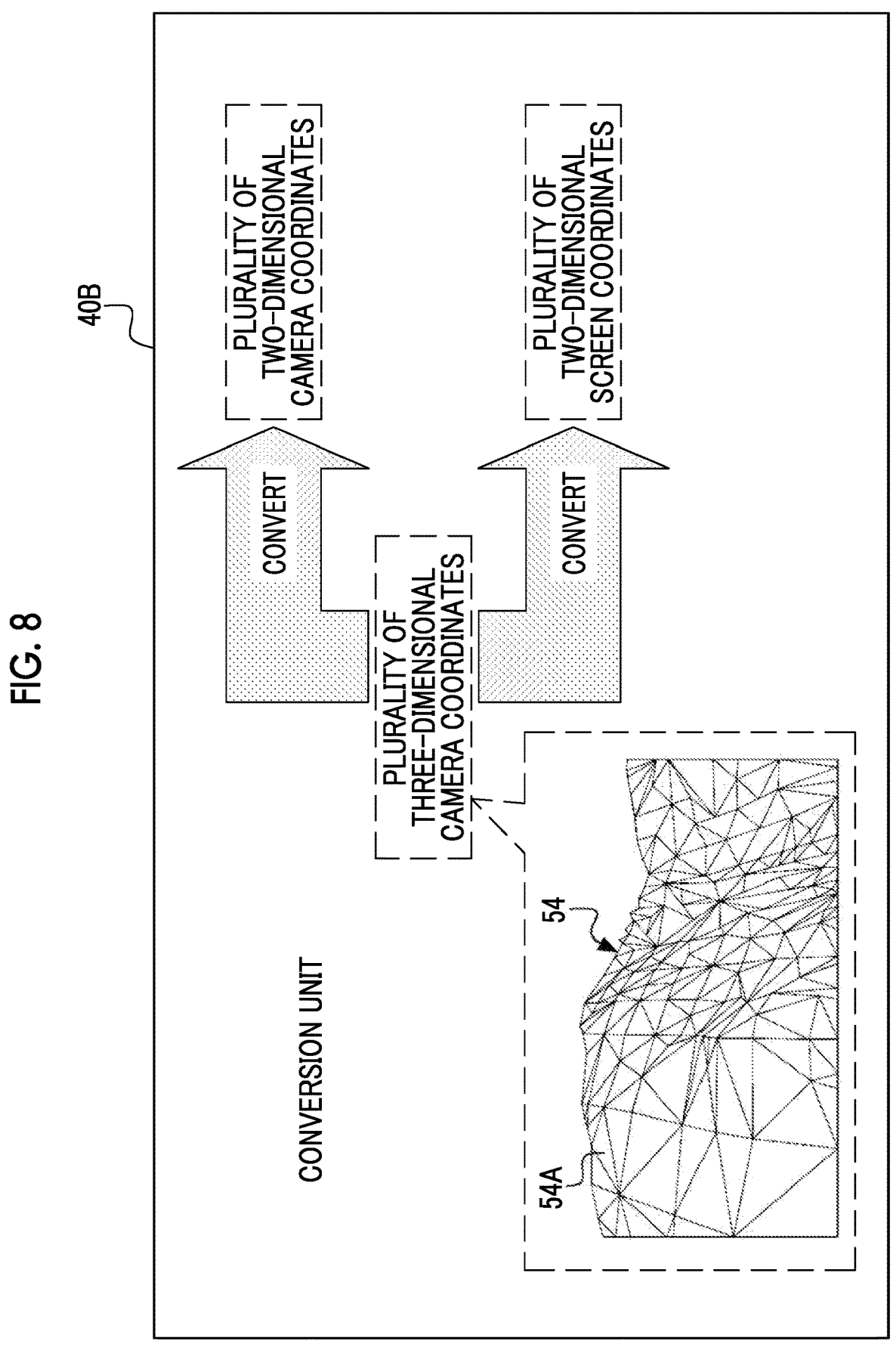
FIG. 8 is a conceptual diagram showing an example of contents of processing of a conversion unit.

In Step ST106, the conversion unit 40B converts the plurality of three-dimensional camera coordinates, which are used in the TIN 54, into a plurality of two-dimensional camera coordinates (refer to FIGS. 8 and 9). After the processing in Step ST106 is executed, the texture mapping processing proceeds to Step ST108.

In Step ST108, the conversion unit 40B converts the plurality of three-dimensional camera coordinates, which are used in the TIN 54, into a plurality of two-dimensional screen coordinates (refer to FIGS. 8 and 9). After the processing in Step ST108 is executed, the texture mapping processing proceeds to Step ST110.

In Step ST110, the pixel assignment unit 40C assigns the pixels at the positions corresponding to the positions of the intersections of the plurality of triangular patches 54A (refer to FIGS. 7 to 9) included in the TIN 54, among a plurality of pixels included in the captured image PD, to the on-screen intersection position, thereby creating a texture image. The texture image, which is obtained by executing the processing of Step ST110, is displayed on the screen 24A.

Next, in order to refine the texture image obtained by executing the processing of Step ST110, the pixel assignment unit 40C performs processing of Step ST112 and processing of Step ST114.

In Step ST112, the pixel assignment unit 40C calculates the two-dimensional screen coordinates (u, v) of the interpolation position on the screen 24A, that is, the second interpolation position $D_0$, through the interpolating method using the two-dimensional camera coordinates obtained in Step ST106, the two-dimensional screen coordinates obtained in Step ST108, and Numerical Expressions (5) to (12) (refer to FIG. 10). After the processing in Step ST112 is executed, the texture mapping processing proceeds to Step ST114.

In Step ST114, the pixel assignment unit 40C assigns a pixel of two-dimensional camera coordinates (in the example shown in FIG. 10, two-dimensional camera coordinates (x, y)) corresponding to the two-dimensional screen coordinates (u, v), among the plurality of pixels constituting the captured image PD, to the two-dimensional screen coordinates (u, v) of the interpolation position on the screen 24A, that is, the second interpolation position $D_0$. Thereby, a texture image, which is finer than the texture image obtained by executing the processing of Step ST110, is displayed on the screen 24A. After the processing in Step ST114 is executed, the texture mapping processing ends.

As described above, in the information processing system 2, the combined point cloud data SG is converted into the plurality of three-dimensional camera coordinates (refer to FIGS. 5 to 7), and the plurality of three-dimensional camera coordinates are converted into the plurality of the two-dimensional camera coordinates and the plurality of two-dimensional screen coordinates (refer to FIGS. 8 and 9). Then, on the screen 24A, the pixels constituting the captured image PD are assigned to the interpolation positions (in the example shown in FIG. 10, the second interpolation position $D_0$) at which the plurality of three-dimensional camera coordinates are specified by the interpolating method using the plurality of two-dimensional camera coordinates and the plurality of two-dimensional screen coordinates (refer to FIG. 10). Thereby, a three-dimensional image (that is, a texture image perceived in a three-dimensional manner by a user) is displayed on the screen 24A. Accordingly, according to the present configuration, it is possible to contribute to high-definition creation of the image on the screen 24A as compared with a case where the image on the screen is created using only the combined point cloud data SG. Further, since the screen 24A is a screen of the display 24, the texture image can be shown to the user through the display 24.

Further, in the information processing system 2, among the plurality of pixels included in the captured image PD, pixels at positions corresponding to positions of the intersections of the plurality of triangular patches 54A (refer to FIGS. 7 to 9) included in the TIN 54 are assigned to the on-screen intersection positions, and thereby the texture image is created. Then, among the plurality of pixels constituting the captured image PD, the pixel of two-dimensional camera coordinates (in the example shown in FIG. 10, two-dimensional camera coordinates (x, y)) corresponding to the two-dimensional screen coordinates (u, v) is assigned to the two-dimensional screen coordinates (u, v) of the interpolation position on the screen 24A, that is, the second interpolation position $D_0$. Thereby, as shown in FIG. 12 as an example, the following embodiment examples are compared. In one embodiment example, pixels at positions corresponding only to the positions of the intersections of the plurality of triangular patches 54A included in the TIN 54 are assigned to the on-screen intersection positions. In another embodiment example, the pixels at the positions corresponding to the positions of the intersections of the plurality of triangular patches 54A included in the TIN 54 and the pixels at the positions corresponding to the positions other than the intersections of the plurality of triangular patches 54A included in the TIN 54 are assigned to the screen 24A. In the latter case, it is possible to obtain a texture image having a density of pixels higher than that in the former case. That is, according to the present configuration, the texture image can be displayed on the screen 24A. The texture image is finer than the texture image created only by assigning the pixels at the positions corresponding to the positions of the intersections of the plurality of triangular patches 54A included in the TIN 54 to the on-screen intersection positions.

In the information processing system 2, the TIN 54 defined by the plurality of triangular patches 54A is generated on the basis of the plurality of three-dimensional camera coordinates. The positions of the intersections of the plurality of triangular patches 54A are defined by the plurality of three-dimensional camera coordinates. The positions of the intersections of the plurality of triangular patches 54A included in the TIN 54 are projected in perspective onto the xy plane PD0 and the uv plane 24A1. The respective pixels of the positions $A_i$, $A_{i+1}$, and $A_{i+2}$ obtained by projecting, in perspective, the positions of the intersections of the plurality of triangular patches 54A onto the xy plane PD0 are assigned to the positions $B_i$, $B_{i+1}$, and $B_{i+2}$ obtained by projecting, in perspective, the positions of the intersections of the plurality of triangular patches 54A onto the uv plane 24A1. Thereby, the texture image is created on the screen 24A. Accordingly, according to the present configuration, it is possible to easily create a texture image compared with a case where the texture image is created without using the polygonal patch such as the triangular patch 54A.

In the information processing system 2, as the second interpolation position $D_0$, the position corresponding to the position other than the intersection of the triangular patches 54A on the screen 24A is applied. That is, the pixel constituting the captured image PD is assigned not only to the on-screen intersection position but also to the second interpolation position $D_0$. Accordingly, according to the present configuration, a finer texture image is displayed on the screen 24A as compared with a case where the pixel constituting the captured image PD is assigned only to the on-screen intersection positions.

In the information processing system 2, the combined point cloud data SG is converted into the plurality of three-dimensional camera coordinates, and the plurality of three-dimensional camera coordinates are converted into the plurality of the two-dimensional camera coordinates and the plurality of two-dimensional screen coordinates. Then, the texture mapping is realized by assigning pixels at the positions specified from the two-dimensional camera coordinates to the positions specified from the two-dimensional screen coordinates. Accordingly, according to the present configuration, it is possible to obtain a texture image with a higher accuracy as compared with a case where the texture mapping is performed without converting the combined point cloud data SG into the plurality of three-dimensional camera coordinates.

In the above-mentioned embodiment, an embodiment example in which one second interpolation position $D_0$ is applied to each triangular patch 54A has been described, but the technique of the present disclosure is not limited thereto. For example, a plurality of second interpolation positions $D_0$ may be applied to each of the triangular patches 54A. In such a case, a plurality of first interpolation positions $C_0$ are provided for each of the triangular patches 54A. Then, the respective pixels of the plurality of corresponding first interpolation positions $C_0$ are assigned to the plurality of second interpolation positions $D_0$. Thereby, it is possible to create a higher-definition texture image as the image to be displayed on the screen 24A as compared with a case where only one second interpolation position $D_0$ is applied to one triangular patch 54A.

Figure 13:
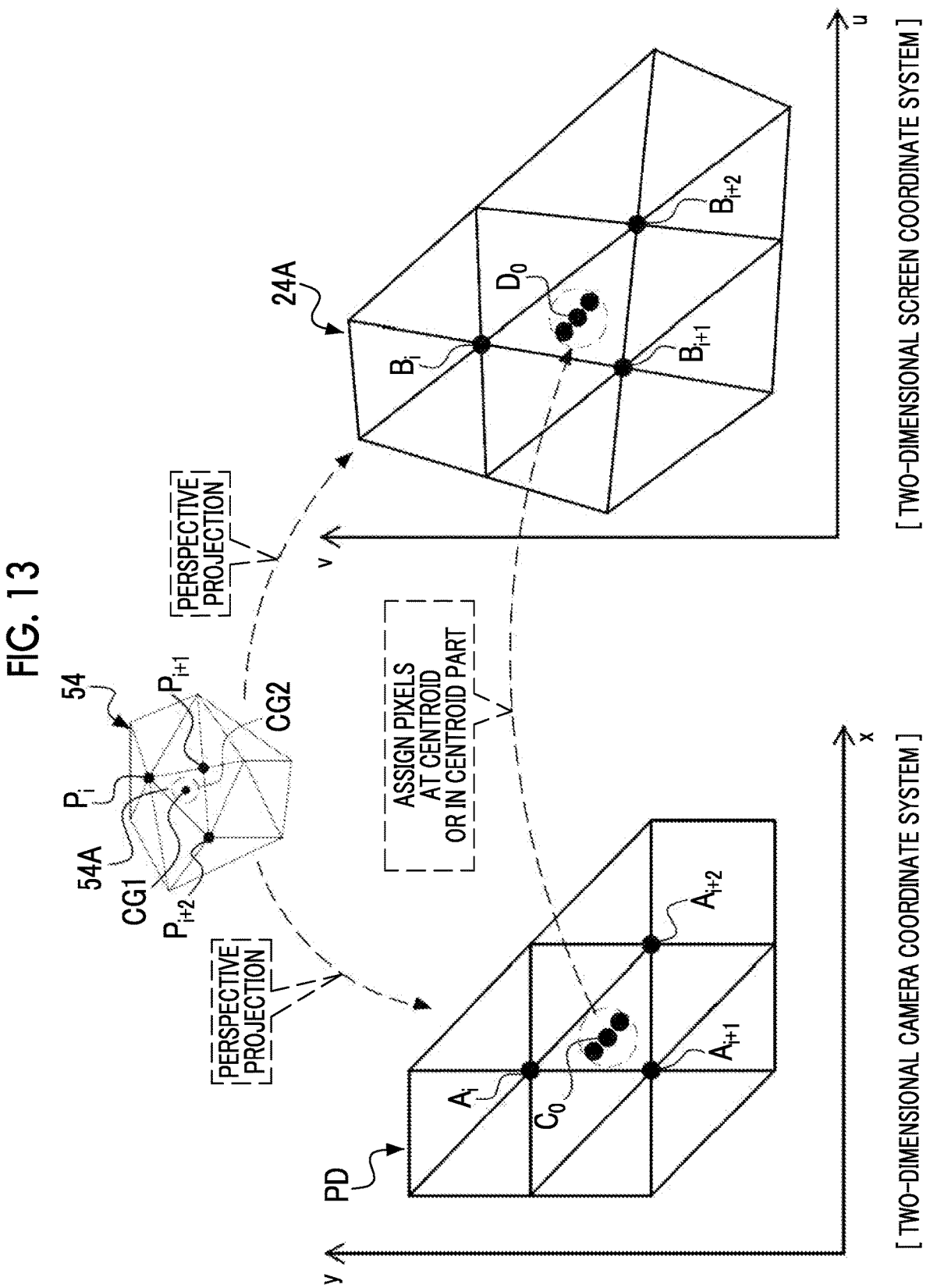
FIG. 13 is a conceptual diagram showing an example of an aspect in which a pixel of a centroid or of a centroid part of a two-dimensional camera coordinate system is assigned to a two-dimensional screen coordinate system.
Figure 14:
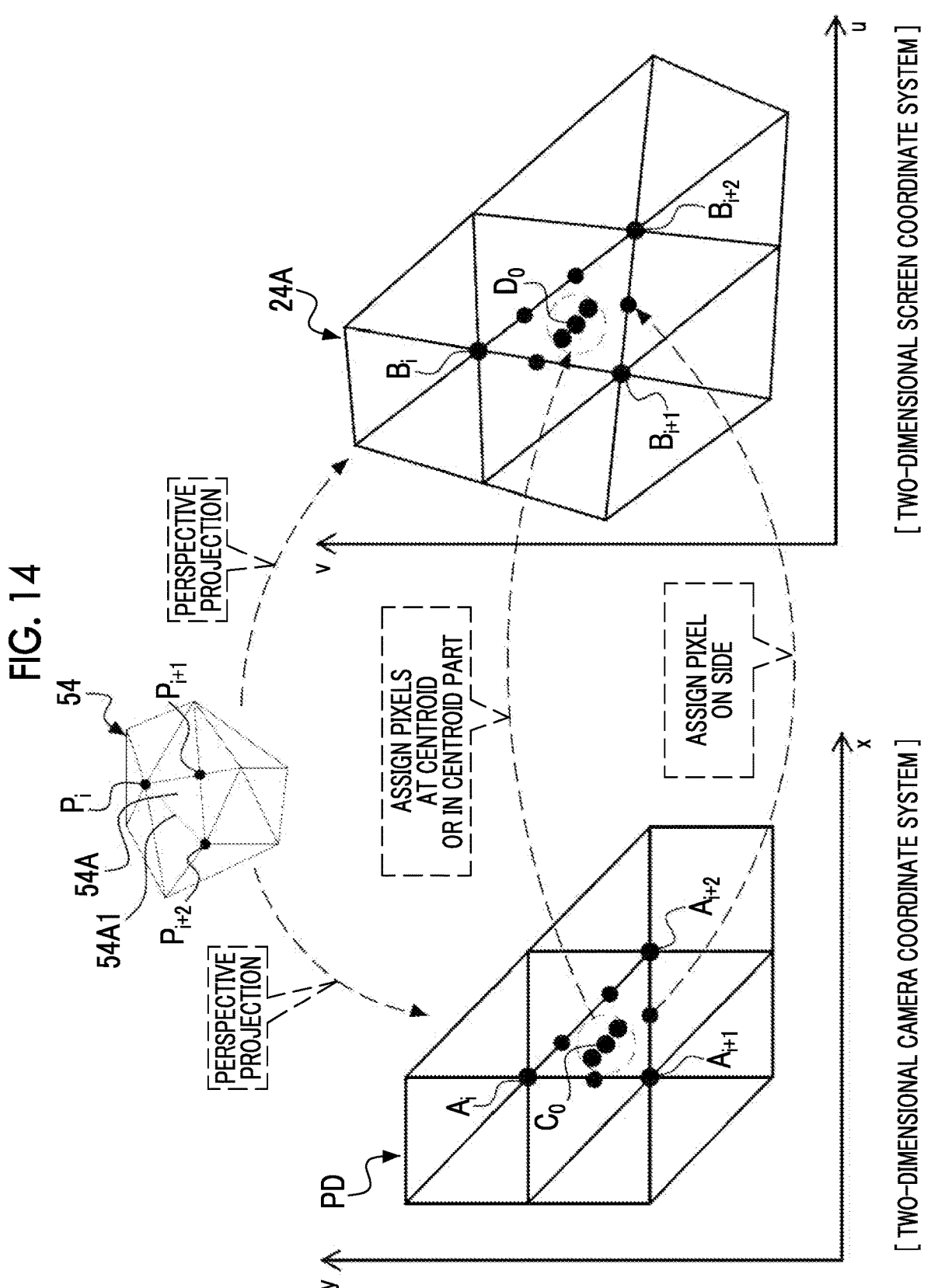
FIG. 14 is a conceptual diagram showing an example of an aspect in which a pixel on a side of the two-dimensional camera coordinate system is assigned to the two-dimensional screen coordinate system.

Further, as shown in FIG. 13 as an example, in the two-dimensional camera coordinate system, at least one second interpolation position $D_0$ may be applied to a portion corresponding to a centroid CG1 and/or a centroid part CG2 of the triangular patch 54A (for example, a circular part centered on the centroid CG1, in a region inside the triangular patch 54A). In such a case, for example, in the two-dimensional camera coordinate system, at least one first interpolation position $C_0$ is given for a location corresponding to each of the centroid CG1 and/or the centroid part CG2 of the triangular patch 54A. Then, the pixel at the corresponding first interpolation position $C_0$ is assigned to at least one second interpolation position $D_0$ in the same manner as in the above-mentioned embodiment. Thereby, in the two-dimensional camera coordinate system, it is possible to suppress the bias of the pixels in the image to be displayed on the screen 24A, as compared with a case where the second interpolation position $D_0$ is applied closer to a location corresponding to the intersection of the triangular patch 54A than to a location corresponding to the centroid CG1 of the triangular patch 54A. Further, as shown in FIG. 14 as an example, at least one second interpolation position $D_0$ may be applied to a location corresponding to a side 54A1 of the triangular patch 54A. In such a case, for example, at least one first interpolation position $C_0$ is given for a portion (in the example shown in FIG. 10, the position $C_1$ and/or $C_2$) corresponding to the side 54A1 of the triangular patch 54A. Then, the pixel at the corresponding first interpolation position $C_0$ is assigned to at least one second interpolation position $D_0$ in the same manner as in the above-mentioned embodiment.

The number of interpolation positions, which are applied to an aggregate of triangles corresponding to the TIN 54 in the two-dimensional camera coordinate system and the two-dimensional screen coordinate system (for example, the average number of interpolation positions applied to the triangular patch 54A), may be changed in response to an instruction (for example, an instruction received by the reception device 22) given from the outside. In such a case, the image displayed on the screen 24A may be further refined. Then, in order to increase the number of interpolation positions applied to the triangle corresponding to the triangular patch 54A in the two-dimensional camera coordinate system and the two-dimensional screen coordinate system, a calculation load applied to the texture mapping processing may be reduced. In such a case, the number of interpolation positions may be reduced.

FIRST MODIFICATION EXAMPLE

In the above-mentioned embodiment, the embodiment example in which the processor 40 executes the texture mapping processing program 52 to be operated as the acquisition unit 40A, the conversion unit 40B, and the pixel assignment unit 40C has been described as an example. However, the technique of the present disclosure is not limited thereto. For example, as shown in FIG. 15, the processor 40 may execute the texture mapping processing program 52 to further operate the processor 40 as a control unit 40D.

Figure 15:
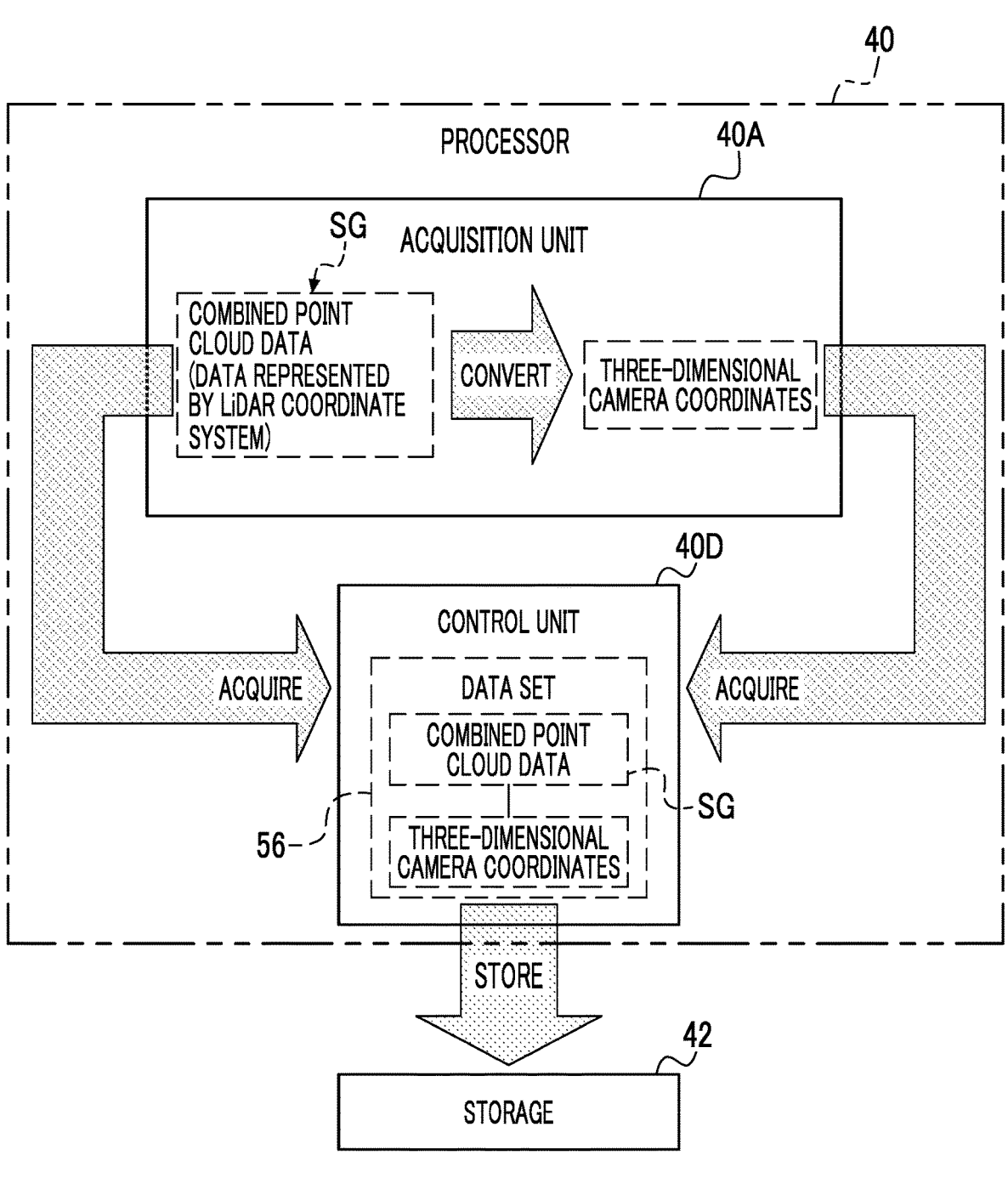
FIG. 15 is a block diagram showing an example of a function of a main unit of a processor according to a first modification example.

For example, as shown in FIG. 15, the control unit 40D causes the acquisition unit 40A to acquire the combined point cloud data SG used for converting the plurality of three-dimensional camera coordinates, and acquires the plurality of three-dimensional camera coordinates obtained by the acquisition unit 40A. The control unit 40D generates a data set 56 that is an example of "association information" according to the technique of the present disclosure, on the basis of the combined point cloud data SG and the plurality of three-dimensional camera coordinates. The data set 56 is information in which the combined point cloud data SG before being converted into the plurality of three-dimensional camera coordinates by the acquisition unit 40A is associated with the plurality of three-dimensional camera coordinates converted from the combined point cloud data SG by the acquisition unit 40A.

The control unit 40D stores the data set 56 in the storage 42. Thereby, the storage 42 holds the data set 56.

Figure 16:
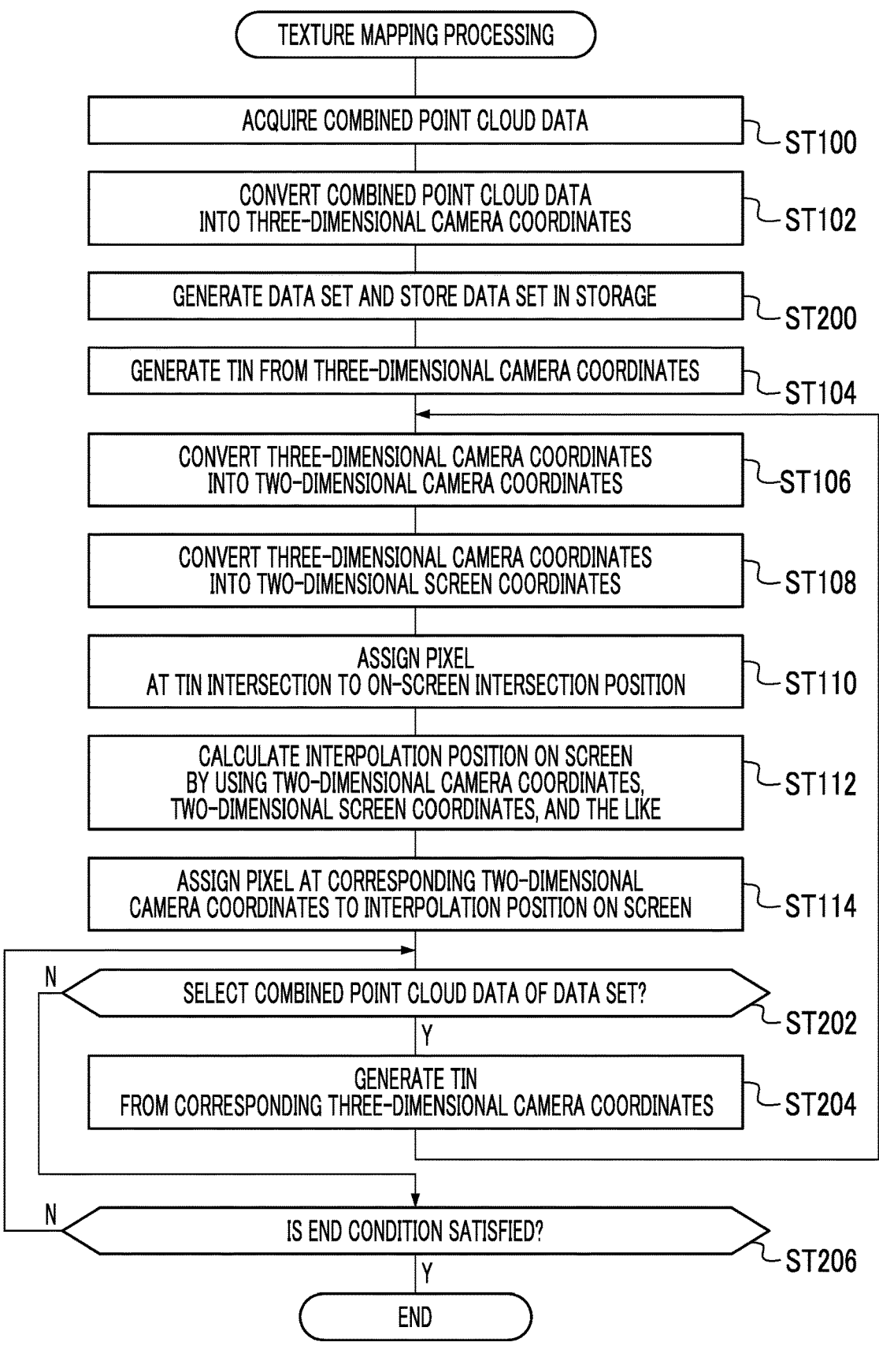
FIG. 16 is a flowchart showing an example of a flow of texture mapping processing according to the first modification example.

As shown in FIG. 16 as an example, the texture mapping processing according to the first modification example is different from the texture mapping processing shown in FIG. 11 in that the texture mapping processing includes the processing of Step ST200 and the processing of Steps ST202 to ST206. The processing of Step ST200 is performed between the processing of Step ST102 and the processing of Step ST104. The processing of Steps ST202 to ST206 is executed after the processing of Step ST114 is executed.

In the texture mapping processing shown in FIG. 16, in Step ST200, the control unit 40D associates the combined point cloud data SG acquired in Step ST100 with the plurality of three-dimensional camera coordinates obtained in Step ST102, thereby generating the data set 56. As a result, the storage 42 stores the generated data set 56.

In Step ST202, the control unit 40D determines whether or not the combined point cloud data SG included in the data set 56 in the storage 42 is selected. The combined point cloud data SG is selected, for example, in response to an instruction received by the reception device 22 (refer to FIG. 3). In Step ST202, in a case where the combined point cloud data SG included in the data set 56 in the storage 42 is not selected, the determination is negative, and the texture mapping processing proceeds to Step ST206. In Step ST202, in a case where the combined point cloud data SG included in the data set 56 in the storage 42 is selected, the determination is positive, and the texture mapping processing proceeds to Step ST204.

In Step ST204, the acquisition unit 40A acquires the plurality of three-dimensional camera coordinates associated with the combined point cloud data SG selected in Step ST202 from the data set 56 in the storage 42, and generates a TIN 54 on the basis of the plurality of three-dimensional camera coordinates acquired. After the processing in Step ST204 is executed, the texture mapping processing proceeds to Step ST106. In Step ST106 to Step ST110, the processing using the TIN 54 generated in Step ST204 is executed. Then, after the processing in Step ST110 is performed, each processing in Steps ST112 and ST114 is performed.

In Step ST206, the control unit 40D determines whether or not a condition of the texture mapping processing ending (hereinafter, referred to as an "end condition") is satisfied. As a first example of the end condition, there is a condition of the reception device 22 (refer to FIG. 3) receiving an instruction to end the texture mapping processing. As a second example of the end condition, there is a condition of a predetermined time (for example, 15 minutes) elapsing without a positive determination being made in Step ST202 from the start of the execution of the texture mapping processing.

In Step ST206, in a case where the end condition is not satisfied, the determination is negative, and the texture mapping processing proceeds to Step ST202. In Step ST206, in a case where the end condition is satisfied, the determination is positive, and the texture mapping processing ends.

As described above, in the first modification example, the storage 42 holds the data set 56 as information in which the combined point cloud data SG and the plurality of three-dimensional camera coordinates are associated with each other. Accordingly, according to the present configuration, in a state where the LiDAR does not again scan a portion of the object 50 at which the combined point cloud data SG is obtained in advance, it is possible to perform the texture mapping processing on the basis of the plurality of three-dimensional camera coordinates.

Further, in the first modification example, the processor 40 generates the TIN 54 with reference to the data set 56 (refer to Step ST204 in FIG. 16), and executes the processing after Step ST106. Thereby, on the screen 24A, the pixels constituting the captured image PD are assigned to the interpolation positions (in the example shown in FIG. 10, the second interpolation position $D_0$) at which the plurality of three-dimensional camera coordinates are specified by the interpolating method using the plurality of two-dimensional camera coordinates and the plurality of two-dimensional screen coordinates. Accordingly, according to the present configuration, in a state where the LiDAR does not again scan a portion of the object 50 in which the combined point cloud data SG is obtained in advance, it is possible to create the three-dimensional image displayed on the screen 24A (that is, a texture image that is three-dimensionally perceived by the user).

SECOND MODIFICATION EXAMPLE

In the above-mentioned embodiment, an embodiment example of the embodiment in which the combined point cloud data SG is converted into the plurality of three-dimensional camera coordinates has been described, but the technique of the present disclosure is not limited thereto. The plurality of three-dimensional camera coordinates may be calculated on the basis of a plurality of captured images PD.

Figure 17:
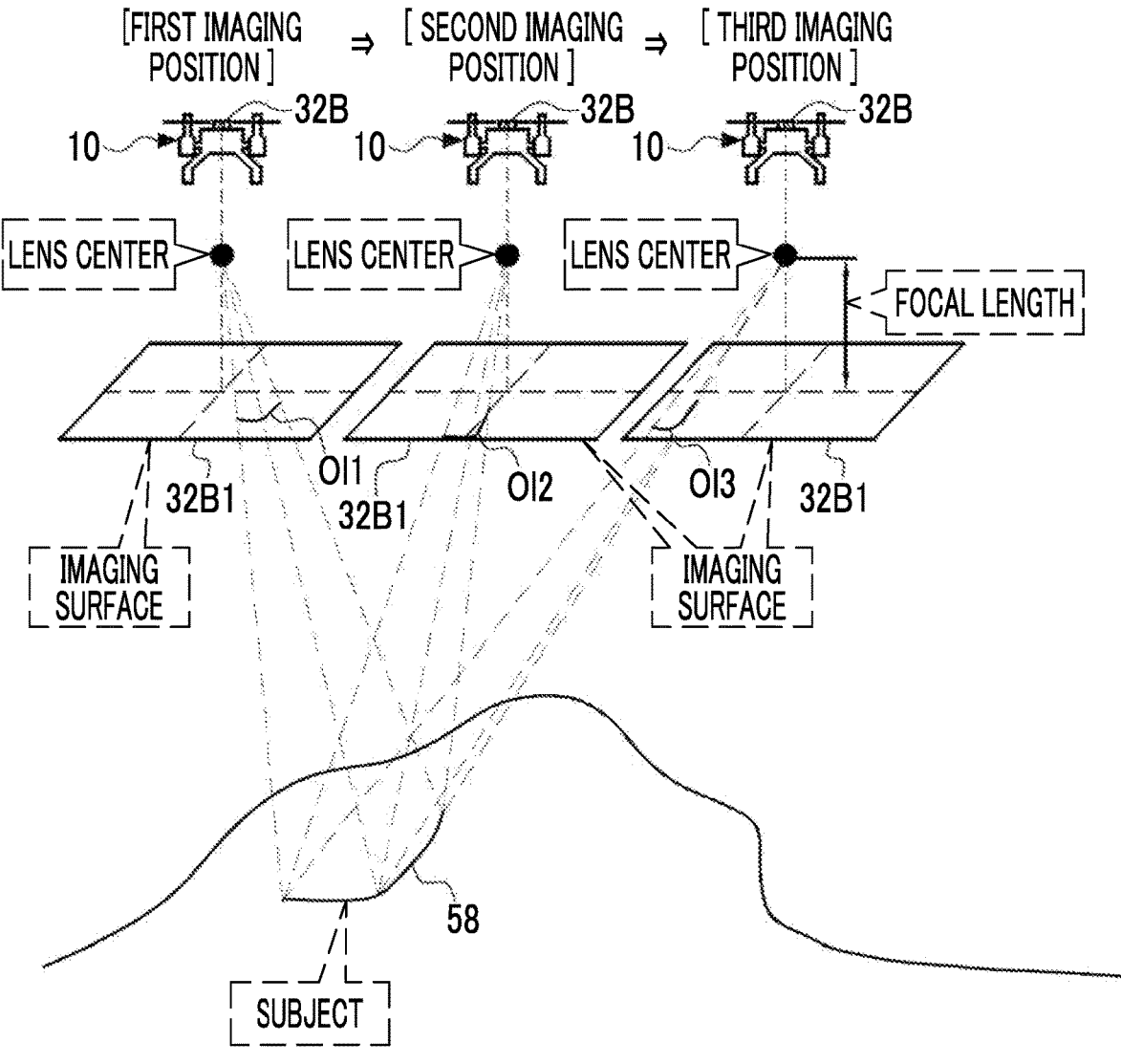
FIG. 17 is a conceptual diagram showing an example of an aspect in which the same subject is imaged by a camera of a movable object while an imaging position is changed.

In such a case, first, as shown in FIG. 17, the movable object 10 is moved to a plurality of positions, and a subject 58 is imaged by the camera 32B from each position. For example, the movable object 10 is moved in order of a first imaging position, a second imaging position, and a third imaging position, and the camera 32B is made to image the subject 58 at each of the first imaging position, the second imaging position, and the third imaging position.

A subject image of the subject 58 is formed on an imaging plane 32B1 at a position away from a center of a lens of the camera 32B by the focal length, and the camera 32B captures the subject image. In the example shown in FIG. 17, a subject image OI1 corresponding to the subject 58 is formed on the imaging plane 32B1 at the first imaging position. Further, a subject image OI2 corresponding to the subject 58 is formed on the imaging plane 32B1 at the second imaging position. Furthermore, a subject image OI3 corresponding to the subject 58 is formed on the imaging plane 32B1 at the third imaging position.

An electronic image corresponding to the subject image OI1 is reflected in the captured image PD captured through imaging performed by the camera 32B at the first imaging position. An electronic image corresponding to the subject image OI2 is reflected in the captured image PD captured through imaging performed by the camera 32B at the second imaging position. An electronic image corresponding to the subject image OI3 is reflected in the captured image PD captured through imaging performed by the camera 32B at the third imaging position.

Figure 18:
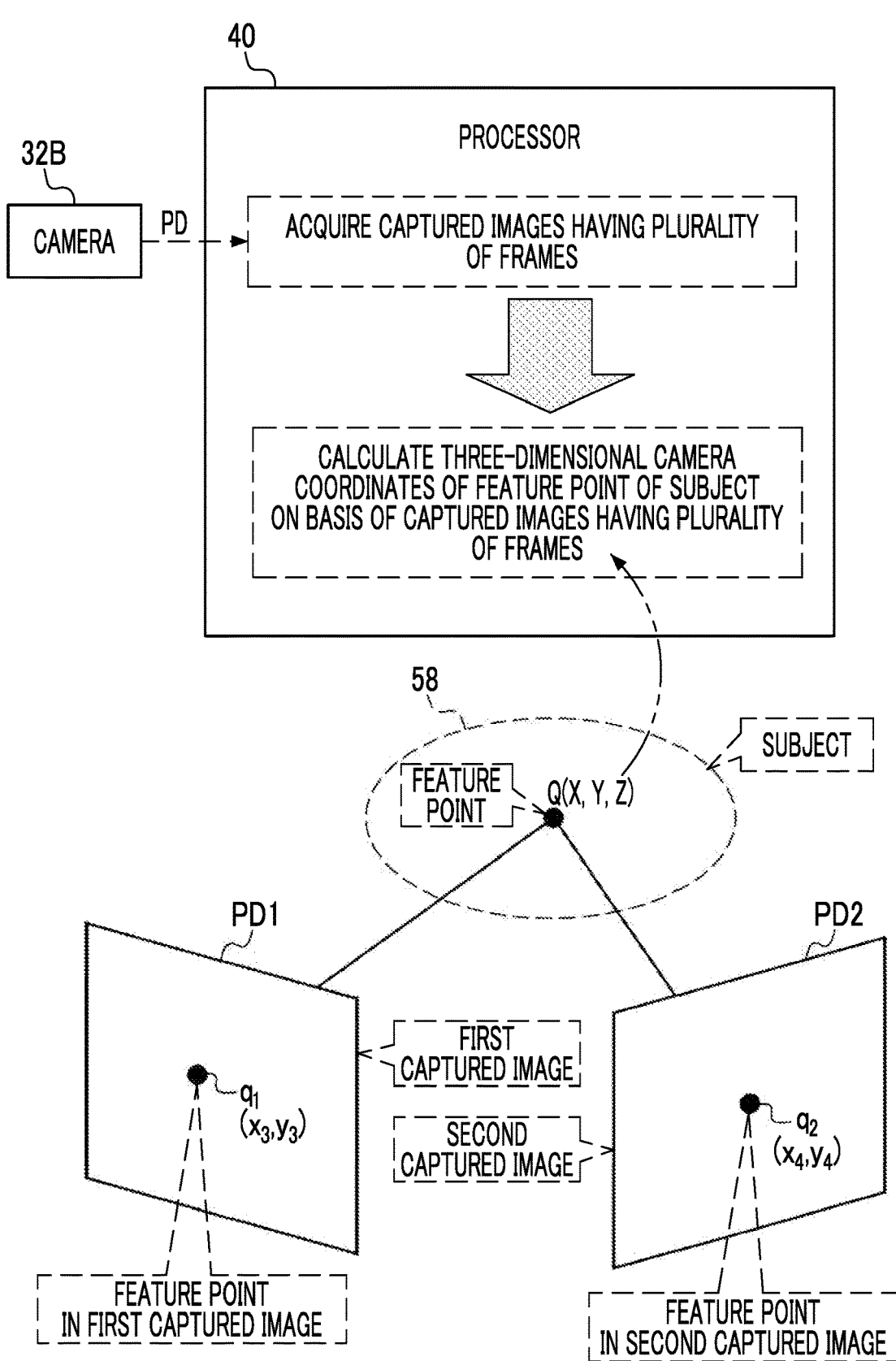
FIG. 18 is a conceptual diagram showing an example of contents of processing of a processor according to a second modification example.

As shown in FIG. 18 as an example, the processor 40 acquires the captured images PD of a plurality of frames from the camera 32B. Here, the captured images PD of the plurality of frames indicate, for example, the captured images PD of the plurality of frames which are captured by imaging the subject 58 with the camera 32B from at least two different positions among the first imaging position, the second imaging position, the third imaging position, and the like. The processor 40 calculates the three-dimensional camera coordinates capable of specifying the position of a feature point of the subject 58, on the basis of the feature points of the subject 58 included as an image (here, as an example, an electronic image) between the plurality of frames of captured images PD captured by imaging the subject 58 with the camera 32B from different positions. As a result, the three-dimensional camera coordinates are acquired.

In the example shown in FIG. 18, a feature point Q included in the subject 58 is shown. A feature point $q_1$ in a first captured image corresponding to the feature point Q is included in a first captured image PD1 captured by imaging the subject 58 with the camera 32B at the first imaging position. Further, a feature point $q_2$ in a second captured image corresponding to the feature point Q is included in a second captured image PD2 captured by imaging the subject 58 with the camera 32B at the second imaging position. The three-dimensional camera coordinates (X, Y, Z) of the feature point Q are calculated on the basis of two-dimensional coordinates $(x_3, y_3)$ that are coordinates in a camera visual field of the feature point $q_1$ in the first captured image and two-dimensional coordinates $(x_4, y_4)$ that are coordinates in a camera visual field of the feature point $q_2$ in the second captured image. Consequently, the processor 40 geometrically calculates the position and the posture of the camera 32B, on the basis of the two-dimensional coordinates $(x_3, y_3)$ of the feature point $q_1$ in the first captured image and the two-dimensional coordinates $(x_4, y_4)$ of the feature point $q_2$ in the second captured image, and calculates the three-dimensional camera coordinates (X, Y, Z) of the feature point Q, on the basis of the calculation result.

As shown in FIG. 19 as an example, the position and the posture of the camera 32B are specified on the basis of an epipolar plane 60 which is a triangular plane having three apexes at the feature point Q, a camera center $O_1$, and a camera center $O_2$. The camera center $O_1$ is present on a straight line passing through the feature point $q_1$ in the first captured image from the feature point Q, and the camera center $O_2$ is present on a straight line passing through the feature point $q_2$ in the second captured image from the feature point Q. The epipolar plane 60 has a baseline BL. The baseline BL is a line segment connecting the camera center $O_1$ and the camera center $O_2$. The epipolar plane 60 has epipoles $e_1$ and $e_2$. The epipole $e_1$ is a point at which the baseline BL and a plane of the first captured image PD1 intersect with each other. The epipole $e_2$ is a point at which the baseline BL and a plane of the second captured image PD2 intersect with each other. The first captured image PD1 has an epipolar line EP1. The epipolar line EP1 is a straight line passing through the epipole $e_1$ and the feature point $q_1$ in the first captured image. The second captured image PD2 has an epipolar line EP2. The epipolar line EP2 is a straight line passing through the epipole $e_2$ and the feature point $q_2$ in the second captured image.

As described above, the camera 32B images the subject 58 present in the three-dimensional space at a plurality of imaging positions (here, for example, the first imaging position and the second imaging position) (that is, the feature point Q is projected onto the plane of the first captured image PD1 as the feature point $q_1$ in the first captured image, and the feature point Q is projected onto the plane of the second captured image PD2 as the feature point $q_2$ in the second captured image). In such a case, an epipolar geometry appears as a unique geometry based on the epipolar plane 60 between the first captured image PD1 and the second captured image PD2. The epipolar geometry indicates a correlation of the feature point Q, the feature point $q_1$ in the first captured image, and the feature point $q_2$ in the second captured image. For example, in a case where the position of the feature point Q changes, the feature point $q_1$ in the first captured image and the feature point $q_2$ in the second captured image change, and the epipolar plane 60 also changes. In a case where the epipolar plane 60 changes, the epipoles $e_1$ and $e_2$ also change, and thus, the epipolar lines EP1 and EP2 also change. That is, the epipolar geometry includes information necessary for specifying the position and the posture of the camera 32B at a plurality of imaging positions (here, as an example, a first imaging position and a second imaging position).

Therefore, the processor 40 calculates a fundamental matrix E from Numerical Expressions (13) to (19), by using the two-dimensional coordinates $(x_3, y_3)$ of the feature point $q_1$ in the first captured image and the two-dimensional coordinates $(x_4, y_4)$ of the feature point $q_2$ in the second captured image, and the epipolar geometry, and estimates a rotation matrix R and a translation vector T from the calculated fundamental matrix E. Then, the processor 40 calculates the three-dimensional camera coordinates (X, Y, Z) of the feature point Q, on the basis of the estimated rotation matrix R and translation vector T.

Here, an example of a method of calculating the fundamental matrix E will be described. A relationship between the three-dimensional camera coordinates $(X_1, Y_1, Z_1)$ of the feature point Q represented in the coordinate system of the camera 32B at the first imaging position and the three-dimensional camera coordinates $(X_2, Y_2, Z_2)$ of the feature point Q represented in the coordinate system of the camera 32B at the second imaging position is established. The relationship is represented by Numerical Expression (13). In Numerical Expression (13), $Q_1$ is the three-dimensional camera coordinates $(X_1, Y_1, Z_1)$ of the feature point Q represented in the coordinate system of the camera 32B at the first imaging position, $Q_2$ is the three-dimensional camera coordinates $(X_2, Y_2, Z_2)$ of the feature point Q represented in the coordinate system of the camera 32B at the second imaging position, R is a rotation matrix (that is, a rotation matrix necessary for conversion from the coordinate system of the camera 32B at the first imaging position to the coordinate system of the camera 32B at the second imaging position), and T is a translation vector (that is, a translation vector necessary for conversion from the coordinate system of the camera 32B at the first imaging position to the coordinate system of the camera 32B at the second imaging position).

[Numerical Expression 13]

$$Q_2 = RQ_1 + T \tag{13}$$

The projection of the three-dimensional camera coordinates $(X_1, Y_1, Z_1)$ of the feature point Q onto the two-dimensional coordinates $(x_3, y_3)$ and $(x_4, y_4)$ is represented by Numerical Expression (14). In Numerical Expression (14), $\lambda_1$ is a value indicating a depth which disappears in a case where the feature point Q is projected onto the first captured image PD1, and $\lambda_2$ is a value indicating a depth which disappears in a case where the feature point Q is projected onto the second captured image PD2.

[Numerical Expression 14]

$$\lambda_2 \begin{pmatrix} x_4 \\ y_4 \\ 1 \end{pmatrix} = \begin{pmatrix} 1 & 0 & 0 & 0 \\ 0 & 1 & 0 & 0 \\ 0 & 0 & 1 & 0 \end{pmatrix} \begin{pmatrix} X_2 \\ Y_2 \\ Z_2 \\ 1 \end{pmatrix}, \lambda_1 \begin{pmatrix} x_3 \\ y_3 \\ 1 \end{pmatrix} = \begin{pmatrix} 1 & 0 & 0 & 0 \\ 0 & 1 & 0 & 0 \\ 0 & 0 & 1 & 0 \end{pmatrix} \begin{pmatrix} X_1 \\ Y_1 \\ Z_1 \\ 1 \end{pmatrix} \tag{14}$$

Numerical Expression (14) is replaced with Numerical Expression (15). By substituting Numerical Expression (15) into Numerical Expression (13), Numerical Expression (16) is obtained.

[Numerical Expression 15]

$$\lambda_2 q_2 = Q_2, \lambda_1 = Q_1 (\lambda_1 = Z_1, \lambda_2 = Z_2) \tag{15}$$

[Numerical Expression 16]

$$\lambda_2 q_2 = R\lambda_1 + T \tag{16}$$

The translation vector T is a vector indicating a distance and an orientation from the camera center $O_2$ to the camera center $O_1$. That is, the translation vector T corresponds to a vector that extends from the camera center $O_2$ to the camera center $O_1$, and coincides with the baseline BL. Meanwhile, "$\lambda_2 q_2$" (that is, "$Q_2$" of Numerical Expression (15)) on the left side of Numerical Expression (16) corresponds to a straight line that extends from the camera center $O_2$ to the feature point Q, and coincides with one side of the epipolar plane 60. Accordingly, an outer product of the translation vector T and "$\lambda_2 q_2$" is a vector W (refer to FIG. 19) perpendicular to the epipolar plane 60. Here, in a case where the outer product of the translation vector T is set for the right side of Numerical Expression (16), the outer product is represented by Numerical Expression (17). In Numerical Expression (17), the translation vector T is represented as a skew-symmetric matrix [T].

[Numerical Expression 17]

$$T \times \lambda_2 q_2 = T \times (R\lambda_1 q_1 + T)$$

$$[T] \times \lambda_2 q_2 = [T] \times R\lambda_1 q_1 \tag{17}$$

The vector W (refer to FIG. 19) and the epipolar plane 60 are orthogonal to each other. Therefore, in a case where the inner product of the two-dimensional coordinates $(x_4, y_4)$ of the feature point $q_2$ in the second captured image is set on both sides of Numerical Expression (17), "0" is obtained as shown in Numerical Expression (18). $\lambda_1$ and $\lambda_2$ are constant terms and do not affect the estimation of the rotation matrix R and of the translation vector T. Therefore, $\lambda_1$ and $\lambda_2$ are eliminated from Numerical Expression (18). In a case where "$E = [T] \times R$", Numerical Expression (19) indicating a so-called epipolar constraint expression is derived from Numerical Expression (18).

[Numerical Expression 18]

$$q_2^T [T] \times \lambda_2 q_2 = q_2^T [T] \times R\lambda_1 q_1 = 0$$

$$q_2^T [T] \times q_2 = q_2^T [T] \times R q_1 = 0 \tag{18}$$

[Numerical Expression 19]

$$E = [T] \times R \rightarrow q_2^T E q_1 = 0 \tag{19}$$

The fundamental matrix E is calculated by a simultaneous equation formed of a plurality of epipolar constraint expressions derived for each of a plurality of feature points including the feature point Q. Since the fundamental matrix E includes only the rotation matrix R and the translation vector T, the rotation matrix R and the translation vector T can also be obtained by calculating the fundamental matrix E. The rotation matrix R and the translation vector T are estimated by using a well-known method such as singular value decomposition, on the basis of the fundamental matrix E (for example, refer to https://ir.lib.hiroshima-u.ac.jp/00027688, 20091125note_reconstruction.pdf, Lecture Notes for Advanced Course of Image Engineering: Three-Dimensional Restoration with Linear Algebra_Toru Tamaki_Nov. 25, 2009_page 59 "1.4.2_Epipolar Geometry with Projective Geometry" to page 69 "1.4.4_Summary of Three-Dimensional Restoration").

The three-dimensional camera coordinates (X, Y, Z) of the feature point Q are calculated by substituting the rotation matrix R and the translation vector T estimated on the basis of the fundamental matrix E into Numerical Expression (13).

As described above, according to the second modification example, the three-dimensional camera coordinates of the feature point Q of the subject 58 are calculated on the basis of the feature point $q_1$ in the first captured image and the feature point $q_2$ in the second captured image of the subject 58 included as an image between the captured images PD of the plurality of frames captured by imaging the subject 58 with the camera 32B from different positions. Accordingly, according to the present configuration, it is possible to calculate the three-dimensional camera coordinates of the feature point Q of the subject 58 without using the LiDAR 32A.

OTHER MODIFICATION EXAMPLES

In the above-mentioned embodiment, the triangular patch 54A has been exemplified, but the technique of the present disclosure is not limited thereto. A quadrangular patch defined by a quadrangular mesh may be used instead of the triangular patch 54A. Further, a patch having a polygonal shape other than a triangle or a quadrangle may be used instead of the triangular patch 54A. In such a manner, in the technique of the present disclosure, since the polygonal patches are used, the texture mapping can be easily performed as compared with a case where the polygonal patches are not used.

In addition, the polygonal patch may be a planar patch or a curved surface patch, but a load applied to the calculation of the texture mapping is smaller in the planar patch than in the curved surface patch. Therefore, it is preferable that the polygonal patch is a planar patch.

In the above-mentioned embodiment, an embodiment example in which the storage 42 stores the texture mapping processing program 52 has been described, but the technique of the present disclosure is not limited thereto. For example, a portable storage medium 100, such as an SSD or a USB memory, may store the texture mapping processing program 52. The storage medium 100 is a non-transitory computer-readable storage medium. The texture mapping processing program 52 stored in the storage medium 100 is installed in the computer 39 of the information processing apparatus 20. The processor 40 executes the texture mapping processing in accordance with the texture mapping processing program 52.

Further, the texture mapping processing program 52 may be stored in a storage device of another computer, a server device, or the like connected to the information processing apparatus 20 through a network. The texture mapping processing program 52 may be downloaded to and installed on the computer 39, in response to a request from the information processing apparatus 20.

It is not necessary to store the entire texture mapping processing program 52 in the storage device of another computer, the server device, or the like connected to the information processing apparatus 20 or in the storage 42, and a part of the texture mapping processing program 52 may be stored.

Further, the computer 39 is built in the information processing apparatus 20 shown in FIG. 3, but the technique of the present disclosure is not limited thereto. For example, the computer 39 may be provided outside the information processing apparatus 20.

In the above-mentioned embodiment, the computer 39 has been exemplified, but the technique of the present disclosure is not limited thereto, and a device including an ASIC, an FPGA, and/or a PLD may be applied instead of the computer 39. Further, instead of the computer 39, a hardware configuration and a software configuration may be used in combination.

As a hardware resource for executing the texture mapping processing described in the above-mentioned embodiment, the following various processors can be used. Examples of the processors include a CPU which is a general-purpose processor functioning as a hardware resource for executing the texture mapping processing by executing software, that is, a program. Further, examples of the processor include a dedicated electric circuit which is a processor having a circuit configuration specially designed for executing a specific processing, such as an FPGA, a PLD, or an ASIC. Any processor has a memory built in or connected to it, and any processor executes the texture mapping processing by using the memory.

The hardware resource for executing the texture mapping processing may be composed of one of these various processors, or may be composed of a combination (for example, a combination of a plurality of FPGAs or a combination of a CPU and an FPGA) of two or more processors of the same type or different types. Further, the hardware resource for executing the texture mapping processing may be one processor.

As an example of configuring a hardware resource with one processor, first, there is a form in which one processor is configured by a combination of one or more CPUs and software, and the processor functions as the hardware resource for executing the texture mapping processing. Secondly, as represented by an SoC, there is a form in which a processor that realizes the functions of the entire system including a plurality of hardware resources for executing the texture mapping processing with one IC chip is used. As described above, the texture mapping processing is realized by using one or more of the various processors as the hardware resources.

Furthermore, as the hardware structure of these various processors, more specifically, it is possible to use an electric circuit in which circuit elements such as semiconductor elements are combined. Further, the texture mapping processing is merely an example. Accordingly, it goes without saying that unnecessary steps may be deleted, new steps may be added, or the processing order may be changed, without departing from the technical scope of the present disclosure.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it goes without saying that unnecessary parts may be deleted, new elements may be added, or replacements may be made in the described contents and illustrated contents shown above without departing from the technical scope of the present disclosure. Further, in order to avoid complications and to facilitate understanding of the parts relating to the technique of the present disclosure, in the described contents and the illustrated contents shown above, the description about common technical knowledge and the like which do not require special explanation in order to enable the implementation of the technique of the present disclosure is not given.

In the present specification, "A and/or B" is synonymous with "at least one of A or B". That is, "A and/or B" means that it may be only A, only B, or a combination of A and B. Further, in the present specification, in a case where three or more matters are connected and expressed by "and/or", the same concept as "A and/or B" is applied.

All documents, patent applications, and technical standards described in the present specification are incorporated into the present specification by reference to the same extent as in a case where the individual documents, patent applications, and technical standards are specifically and individually stated to be incorporated by reference.

What is claimed is:

1. An image processing device comprising:

a processor; and a memory that is built in or connected to the processor, wherein a positional relationship between a three-dimensional distance-measuring sensor and an imaging apparatus having a higher sampling resolution than the three-dimensional distance-measuring sensor is given, and the processor is configured to:

acquire three-dimensional coordinates of a three-dimensional distance-measuring sensor defined in a three-dimensional coordinate system applied to the three-dimensional distance-measuring sensor, on the basis of distance measurement results of the three-dimensional distance-measuring sensor for a plurality of measurement points, the three-dimensional coordinates of the three-dimensional distance-measuring sensor being capable of specifying positions of the plurality of measurement points;

acquire three-dimensional coordinates of an imaging apparatus defined in a three-dimensional coordinate system applied to the imaging apparatus, on the basis of the three-dimensional coordinates of the three-dimensional distance-measuring sensor;

convert the three-dimensional coordinates of the imaging apparatus into two-dimensional coordinates of the imaging apparatus, which are capable of specifying a position in a captured image which is captured through imaging performed by the imaging apparatus;

convert the three-dimensional coordinates of the imaging apparatus into two-dimensional coordinates of a display, which are capable of specifying a position on a screen;

assign a pixel constituting the captured image to an interpolation position specified through an interpolating method using the two-dimensional coordinates of the imaging apparatus and the two-dimensional coordinates of the display, on the screen;

acquire the three-dimensional coordinates of the imaging apparatus by converting the three-dimensional coordinates of the three-dimensional distance-measuring sensor into the three-dimensional coordinates of the imaging apparatus;

generate a polygonal patch on the basis of the three-dimensional coordinates of the imaging apparatus; and the three-dimensional coordinates of the imaging apparatus define a position of an intersection of the polygonal patch, wherein the interpolation position is a position corresponding to a position other than the intersection of the polygonal patch, on the screen, and the processor is configured to create a three-dimensional image by assigning a pixel at a position corresponding to the position of the intersection of the polygonal patch, among a plurality of pixels included in the captured image, to an on-screen intersection position corresponding to the position of the intersection of the polygonal patch, on the screen.

2. The image processing device according to claim 1, wherein the polygonal patch is defined by a triangular mesh or a quadrangular mesh.

3. The image processing device according to claim 1, wherein the processor is configured to acquire the three-dimensional coordinates of the imaging apparatus by calculating the three-dimensional coordinates of the imaging apparatus on the basis of a feature point of a subject included as an image between images of a plurality of frames captured by imaging the subject with the imaging apparatus from different positions.

4. The image processing device according to claim 1, wherein the position on the screen is a position on a screen of a display.

5. The image processing device according to claim 1, wherein the memory holds association information in which the three-dimensional coordinates of the three-dimensional distance-measuring sensor and the two-dimensional coordinates of the imaging apparatus are associated with each other.

6. The image processing device according to claim 5, wherein the processor is configured to assign the pixel constituting the captured image to the interpolation position with reference to the association information.

7. An image processing method comprising:

acquiring three-dimensional coordinates of a three-dimensional distance-measuring sensor defined in a three-dimensional coordinate system applied to a three-dimensional distance-measuring sensor, on the basis of distance measurement results of the three-dimensional distance-measuring sensor for a plurality of measurement points, the three-dimensional coordinates of the three-dimensional distance-measuring sensor being capable of specifying positions of the plurality of measurement points, on condition that a positional relationship between the three-dimensional distance-measuring sensor and an imaging apparatus having a higher sampling resolution than the three-dimensional distance-measuring sensor is given;

acquiring three-dimensional coordinates of an imaging apparatus defined in a three-dimensional coordinate system applied to the imaging apparatus, on the basis of the three-dimensional coordinates of the three-dimensional distance-measuring sensor;

converting the three-dimensional coordinates of the imaging apparatus into two-dimensional coordinates of the imaging apparatus, which are capable of specifying a position in a captured image which is captured through imaging performed by the imaging apparatus;

converting the three-dimensional coordinates of the imaging apparatus into two-dimensional coordinates of a display, which are capable of specifying a position on a screen;

assigning a pixel constituting the captured image to an interpolation position specified through an interpolating method based on the two-dimensional coordinates of the imaging apparatus and the two-dimensional coordinates of the display, on the screen;

acquiring the three-dimensional coordinates of the imaging apparatus by converting the three-dimensional coordinates of the three-dimensional distance-measuring sensor into the three-dimensional coordinates of the imaging apparatus; and generating a polygonal patch on the basis of the three-dimensional coordinates of the imaging apparatus, wherein the three-dimensional coordinates of the imaging apparatus define a position of an intersection of the polygonal patch, the interpolation position is a position corresponding to a position other than the intersection of the polygonal patch, on the screen, and the image processing method further comprises creating a three-dimensional image by assigning a pixel at a position corresponding to the position of the intersection of the polygonal patch, among a plurality of pixels included in the captured image, to an on-screen intersection position corresponding to the position of the intersection of the polygonal patch, on the screen.

8. A non-transitory computer-readable storage medium storing a program executable by a computer to perform a process comprising:

acquiring three-dimensional coordinates of a three-dimensional distance- measuring sensor defined in a three-dimensional coordinate applied to a three-dimensional distance-measuring sensor, on the basis of distance measurement results of the three-dimensional distance-measuring sensor for a plurality of measurement points, the three-dimensional coordinates of the three-dimensional distance-measuring sensor being capable of specifying positions of the plurality of measurement points, on condition that a positional relationship between the three-dimensional distance-measuring sensor and an imaging apparatus having a higher sampling resolution than the three-dimensional distance-measuring sensor is given;

acquiring three-dimensional coordinates of an imaging apparatus defined in a three-dimensional coordinate system applied to the imaging apparatus, on the basis of the three-dimensional coordinates of the three-dimensional distance-measuring sensor;

converting the three-dimensional coordinates of the imaging apparatus into two-dimensional coordinates of the imaging apparatus, which are capable of specifying a position in a captured image which is captured through imaging performed by the imaging apparatus;

converting the three-dimensional coordinates of the imaging apparatus into two-dimensional coordinates of a display, which are capable of specifying a position on a screen;

assigning a pixel constituting the captured image to an interpolation position specified through an interpolating method using the two-dimensional coordinates of the imaging apparatus and the two-dimensional coordinates of the display, on the screen;

acquiring the three-dimensional coordinates of the imaging apparatus by converting the three-dimensional coordinates of the three-dimensional distance-measuring sensor into the three-dimensional coordinates of the imaging apparatus; and generating a polygonal patch on the basis of the three-dimensional coordinates of the imaging apparatus, wherein the three-dimensional coordinates of the imaging apparatus define a position of an intersection of the polygonal patch, the interpolation position is a position corresponding to a position other than the intersection of the polygonal patch, on the screen, and the process further comprises creating a three-dimensional image by assigning a pixel at a position corresponding to the position of the intersection of the polygonal patch, among a plurality of pixels included in the captured image, to an on-screen intersection position corresponding to the position of the intersection of the polygonal patch, on the screen.

* * * * *